(12) United States Patent
McEncroe et al.

(10) Patent No.: US 12,330,975 B1
(45) Date of Patent: Jun. 17, 2025

(54) SELF CONTAINED MODULAR DECENTRALIZED POINT OF USE FLUID TREATMENT SYSTEM APPARATUS

(71) Applicants: John James McEncroe, Golden, CO (US); Alexander Leonel Chavez-Maldonado, Thornton, CO (US); Avery Conaghan, Superior, CO (US); Bahman Rejai, Centennial, CO (US); Cole Bright, Golden, CO (US); Justin Fink, Pueblo, CO (US); Maximillian Garza, Oakland, CA (US); Mya Newberry, Littleton, CO (US); Tierra Tisby Burke, Colorado Springs, CO (US)

(72) Inventors: John James McEncroe, Golden, CO (US); Alexander Leonel Chavez-Maldonado, Thornton, CO (US); Avery Conaghan, Superior, CO (US); Bahman Rejai, Centennial, CO (US); Cole Bright, Golden, CO (US); Justin Fink, Pueblo, CO (US); Maximillian Garza, Oakland, CA (US); Mya Newberry, Littleton, CO (US); Tierra Tisby Burke, Colorado Springs, CO (US)

( * ) Notice: Subject to any disclaimer, the term of this patent is extended or adjusted under 35 U.S.C. 154(b) by 0 days.

(21) Appl. No.: 18/934,248

(22) Filed: Nov. 1, 2024

(51) Int. Cl.
*C02F 9/00* (2023.01)
*C02F 1/00* (2023.01)
(Continued)

(52) U.S. Cl.
CPC ............... *C02F 9/00* (2013.01); *C02F 1/004* (2013.01); *C02F 1/008* (2013.01); *C02F 1/283* (2013.01); *C02F 1/325* (2013.01); *C02F 1/42* (2013.01); *C02F 2001/422* (2013.01); *C02F 2001/425* (2013.01); *C02F 1/66* (2013.01);
(Continued)

(58) Field of Classification Search
CPC .. C02F 9/00; C02F 1/004; C02F 1/008; C02F 1/283; C02F 1/325; C02F 1/42; C02F 1/66; C02F 1/76; C02F 2001/422; C02F 2001/425; C02F 2201/005; C02F 2201/006; C02F 2201/007; C02F 2201/3227; C02F 2201/326; C02F 2209/03; C02F 2209/29;
(Continued)

(56) References Cited

U.S. PATENT DOCUMENTS

| 5,399,260 A * | 3/1995 | Eldredge | C02F 1/76 210/411 |
| 6,863,827 B2 * | 3/2005 | Saraceno | C02F 9/20 210/85 |

(Continued)

*Primary Examiner* — Terry K Cecil
(74) *Attorney, Agent, or Firm* — Roger A. Jackson

(57) ABSTRACT

A self-contained modular decentralized point of use fluid treatment system apparatus disposed in an open atmosphere environment, the self-contained modular decentralized point of use fluid treatment system apparatus is for treating a fluid in going from a raw fluid state to a purified fluid state, the fluid treatment system apparatus includes an influent vessel, multiple stages of filtration for particulates, plus additional filters for activated carbon, anion exchange resin, cation exchange resin, ultraviolet light, mineral cartridge, further including a pump/motor combination, and a purified fluid container all being disposed within a structural framework.

24 Claims, 22 Drawing Sheets

(51) Int. Cl.
*C02F 1/28* (2023.01)
*C02F 1/32* (2023.01)
*C02F 1/42* (2023.01)
*C02F 1/66* (2023.01)
*C02F 1/76* (2023.01)

(52) U.S. Cl.
CPC .......... *C02F 1/76* (2013.01); *C02F 2201/005* (2013.01); *C02F 2201/006* (2013.01); *C02F 2201/007* (2013.01); *C02F 2201/3227* (2013.01); *C02F 2201/326* (2013.01); *C02F 2209/03* (2013.01); *C02F 2209/29* (2013.01); *C02F 2209/40* (2013.01); *C02F 2301/043* (2013.01); *C02F 2301/08* (2013.01); *C02F 2303/04* (2013.01)

(58) Field of Classification Search
CPC ............ C02F 2209/40; C02F 2301/043; C02F 2301/08; C02F 2303/04
See application file for complete search history.

(56) References Cited

U.S. PATENT DOCUMENTS

| | | | |
|---|---|---|---|
| 7,632,410 B2 * | 12/2009 | Heiss | C02F 9/00 |
| | | | 210/85 |
| 10,696,575 B1 * | 6/2020 | Pyle | C02F 1/008 |
| 11,261,116 B2 | 3/2022 | McEncroe | |
| 11,267,739 B2 * | 3/2022 | Steele | G09B 19/0076 |

* cited by examiner

SELF CONTAINED MODULAR DECENTRALIZED POINT OF USE FLUID TREATMENT SYSTEM APPARATUS

CROSS-REFERENCE TO RELATED APPLICATIONS

There are no related applications.

BACKGROUND OF INVENTION

The present invention is generally related to water treatment systems and more particularly to household use self-contained water treatment systems for producing potable water from either compromised municipal water supplies or other non-potable water sources.

In U.S. Pat. No. 7,632,410 to Heiss, disclosed is a portable universal water purification system that includes a method for producing safe drinking water from any water source, wherein the main goal is to minimize the maintenance required from contamination of water treatment components that include particle barriers, reverse osmosis membranes (RO), ultraviolet light (UV), hydrocarbon absorbent media, chlorine, ozonation, as the typical water purification components, via using water pressure and flow monitoring that can determine when to backflush filters, the UV light has a wiping device to keep the light transmission levels high, while using oxidation after RO to destroy organic compounds as opposed to self-exhausting filter media, finally ozonation and chlorine are used as residual disinfectant.

In U.S. Pat. No. 6,863,827 to Saraceno, disclosed is a solar powered portable water purifier that includes multiple water filters and an ultraviolet light (UV) wherein purified water is discharged, compared to many water treatment systems, Saraceno has minimal components (i.e. a single UV treatment) that would limit the degree of contaminated water that the Saraceno unit could handle.

What is needed is a fluid treatment system that employs existing technologies to economically produce potable water in a configuration which provides the requisite flexibility for everyday use in the home, portable use away from home, and during civil potable water supply emergencies. Unlike bottled water which is processed in a controlled environment and subsequently distributed in tamper evident packaging (and which may be unavailable during civil emergencies when most needed), municipally treated water is pumped through a complicated water distribution system in which there are numerous potential places for contamination, and which are not under the direct control of the water supplier. Indeed, one study found that 30.3% of waterborne disease outbreaks in the United States could be traced to our treated water distribution systems (Craun & Calderon 2001).

The present invention process can help eliminate outbreaks related to distribution system contamination events. In addition to concerns with contamination of treated water within municipal water distribution systems, there are trace amounts of human made chemicals, such as endocrine disrupting compounds, which are routinely detected in the treated water leaving our municipal drinking water plants. Until relatively recent advances in laboratory analysis capabilities, the presence of trace amounts of many of these chemicals was immeasurable. Dr. Joerg Drewes (formerly at Colorado School of Mines and now at the University of Munich) stated his concern about these chemicals as follows: In addition to concerns about individual endocrine disrupting compounds, there is concern about the cocktail effect of numerous micropollutants and/or their metabolites (lecture notes from ESGN 603 at Colorado School of Mines, Sep. 9, 2004). Indeed, there are over 83,000 chemicals currently in the Toxic Substances Control Act (TSCA) inventory (testimony before the Subcommittee on Commerce, Trade, and Consumer Protection, Committee on Energy, and Commerce, House of Representatives by John Stephenson, Director Natural Resources and the Environment GAO, Feb. 26, 2009, GAO-09-428T Chemical Regulation, Options for Enhancing the Effectiveness of TSCA).

The regulatory community and municipal water industry are at a crossroads. At an enormous cost, we can remove these trace contaminants using centralized municipal water treatment, but does it make sense to do so when less than 1% of our municipal water supply is ingested (Vickers 2001), and when we know that about ⅓ of disease outbreaks attributable to our potable water systems can be traced to our water distribution systems, the problem needs attention. Although bottled water is generally free of endocrine disrupting compounds and of high microbial purity, as stated before it may be unavailable during civil emergencies when it is most needed. The present invention being a self-contained countertop or under counter (portable) water treatment system, wherein the water treatment system uses multiple stages of filtration, and/or adsorption, and/or ion exchange, coupled with multiple stages of UV disinfection, to reliably and economically address these exposures.

The present invention fluid/water treatment system is a logical, economical, and effective, addition to the water industry's traditional "multiple barrier" treatment strategy. Although there are numerous manufacturers of "Point-of-Use" water treatment systems, to be successful in persuading the EPA, state and local Health Departments, and municipal water suppliers to approve and employ a "Point-of-Use" system they need a free-standing smaller self-contained countertop or under counter design which: Eliminates the nebulous variables and costs related to under-the-counter installations; is convenient and easy for the user to operate and have the utility to swap out on a scheduled basis (generally every six months, but variable depending on water system quality); and which provides potable water by protecting the user against microbiological, inorganic, and organic contaminants. Although reverse osmosis (RO) systems provide a high degree of purity, healthful minerals are removed from the water and a liquid waste stream is generated which must be disposed of (typically by a connection to a drain), this is why the present invention does not employ RO, thus the present invention will not remove these beneficial constituents, nor will it generate a liquid waste stream.

To ensure the provision of potable water, the present invention employs typically but not limited to the following physical treatment steps including:

Filtration with the inclusion of a filtration cartridge at <0.45 um will physically exclude pathogenic bacteria, as locating this upstream of the Ultraviolet (UV), will provide more effective UV and reduce the potential for microbial growth in the GAC, as well as the Ion Exchange;

Ultraviolet 1st (UV) disinfection;

Additional filtration that could include Granular Activated Carbon (GAC) adsorption;

Ion exchange cartridges at <3 um (inclusion of a filtration cartridge at <0.45 um will physically exclude pathogenic bacteria);

Ultraviolet $2^{nd}$ (UV) disinfection following filtration/adsorption/ion exchange to ensure that any pathogens passing through, or surviving, the prior physical treatment steps are inactivated. One of the biggest drawbacks of water treatment systems that use carbon adsorption for organics (and chlorine) removal is that there is no method supplied with any system to determine the efficacy of the adsorption system. It is quite possible that subsequent to a serious distribution system event, the user would mistakenly believe that adsorption is occurring, when in fact the carbon's adsorption ability has been seriously compromised or otherwise exhausted. As such, a generic chlorine disinfectant residual test kit is included as part of the system.

The vast majority of the time there will be a chlorine residual in the influent to the system from a municipal water treatment system and no residual in the treated water from the present invention system (which would indicate effective adsorption). In the event of the failure of the UV disinfection process, specific instructions are included on how to add chlorine bleach (a common household disinfectant) to the filtered water are included with the present invention system (the generic chlorine residual test kit can be used to determine if an adequate amount of chlorine has been added). Additionally, even if the UV system is working, if a boil water order has been placed by the state or local health department (or during a civil emergency) the chlorine bleach addition instructions will provide peace of mind for the user who wants additional assurance that the water from the present invention system is potable. In the event of pump failure, a syringe is provided or alternatively, a gas pressure source that is selected from the group consisting of, a compressor, an accumulator, a piston movably disposed in a cylinder, a bladder, or a pressure tank, so that potable water can be obtained by manually pumping/forcing water through the present invention system.

SUMMARY OF THE INVENTION

Broadly, the present invention is a self-contained modular decentralized point of use fluid treatment system apparatus disposed in an open atmosphere environment, the self-contained modular decentralized point of use fluid treatment system apparatus is for treating a fluid in going from a raw fluid state to a purified fluid state, the fluid treatment system apparatus including a frustro-conical replaceable filter media element loosely disposed in a matching frusto-conical housing, wherein the frustro-conical replaceable filter media element is in the range of approximately twenty microns to approximately one-hundred fifty microns, with the frustro-conical replaceable filter media element and the frustro-conical housing are constructed as an upwardly facing diverging environmentally open to the atmosphere primary inlet reservoir with a gravity induced converging fluid filtration of the raw fluid, being operational to functionally provide an initial coarse of raw fluid filtration defined as a stage one fluid filtration that is discharged therethrough a convergent gravity feed outlet.

Further included in the present invention is an influent vessel having an upper influent vessel inlet that is in a first fluid communication with the convergent gravity feed outlet, the influent vessel also having a lower influent vessel outlet, the influent vessel having an internal volume, also in addition a fluid flow sensor having a fluid flow sensor inlet that is in a second fluid communication with the lower influent vessel outlet, the fluid flow sensor having a fluid flow sensor outlet, the fluid flow sensor further outputs an electrical signal in conjunction with a flow state status being defined as a fluid flow state and a non-fluid flow state.

Additionally, included in the present invention is a fluid pump and motor combination with a fluid pump inlet that is in a third fluid communication with the fluid flow sensor outlet, the fluid pump also having a fluid pump outlet, the fluid pump is sized and configured to have a volumetric flowrate in the range of approximately ten percent to approximately twenty five percent of a batch volume of the raw fluid to operationally facilitate a selected empty bed contact time (EBCT) of the fluid as the fluid is processed therethrough the self-contained modular decentralized point of use fluid treatment system apparatus to operationally accomplish the end purified fluid state, the batch volume is defined as a portion of the internal volume, alternatively the fluid pump can operate in a continuous flow state of the purified fluid with the volumetric flowrate.

The present invention also has included control circuitry to activate and to deactivate the fluid pump and motor combination, the control circuitry is operative to facilitate a batch system process of the fluid treatment in going from the raw fluid state to the purified fluid state, the control circuitry is in a first electrical communication with the fluid flow sensor electrical signal output for a control circuitry input, wherein the control circuitry is operative to monitor the fluid flow sensor electrical output signal, further the control circuitry is in a second electrical communication with a manually selectable switch, wherein the control circuitry is operative to monitor the manually selectable switch, wherein the control circuitry is operative to produce a plurality of event marker signals to an electrical relay that is in a third electrical communication with the fluid pump and motor combination to operationally enable a first function of a manual pump and motor activation and to enable a second function of an automatic pump and motor deactivation upon the fluid flow sensor being in the non-fluid flow state to protect the pump and motor combination from damage.

Additionally included in the presentation invention a stage two filtration fluid filter having a stage two filtration fluid filter inlet and a stage two filtration fluid filter outlet, wherein the stage two filtration fluid filter inlet is in a fourth fluid communication with said fluid pump outlet, the stage two filtration fluid filter is a mechanical string wound type having filtration levels of less than approximately fifty microns, also a stage three filtration fluid filter having a stage three filtration fluid filter inlet and a stage three filtration fluid filter outlet, wherein the stage three filtration fluid filter inlet is in a fifth fluid communication with the stage two filtration fluid filter outlet, the stage three filtration fluid filter is a mechanical string wound type having filtration levels of less than approximately ten microns. Also, a stage four filtration being an activated granular carbon absorption fluid filter having a stage four filtration fluid filter inlet and a stage four filtration fluid filter outlet, wherein the stage four filtration fluid filter inlet is in a sixth fluid communication with the stage three filtration fluid filter outlet, the stage four filtration activated granular carbon absorption fluid filter is an anti-microbial twenty mesh by fifty mesh or two-hundred and ninety seven micron to eight-hundred forty one micron coconut shell based granular activated carbon being operational to functionally to help remove organics and help resist microbial contamination.

Continuing in the present invention included is a stage five filtration being an activated granular carbon absorption fluid filter having a stage five filtration fluid filter inlet and a stage five filtration fluid filter outlet, wherein the stage five filtration fluid filter inlet is in a seventh fluid communication with the stage four filtration fluid filter outlet, the stage five filtration activated granular carbon absorption fluid filter is an acid washed twelve mesh by forty mesh or four-hundred micron to one-thousand six-hundred and eighty micron coconut shell based granular activated carbon being operational to functionally help remove per- and polyfluoroalkyl substances or PFAS including PFOS. Also, included is a stage six filtration being an anion exchange resin fluid filter having a stage six filtration fluid filter inlet and a stage six filtration fluid filter outlet, wherein the stage six filtration fluid filter inlet is in an eighth fluid communication with the stage five filtration fluid filter outlet, the stage six filtration anion exchange resin fluid filter is a color indicating anion resin in hydroxide form polystyrenic porous gel sixteen mesh by fifty mesh or two-hundred ninety seven micron to eleven-hundred ninety micron being operational to functionally help remove anions that can include but are not limited to chlorine, hydroxide, iodide, dichromate, oxide, and sulfate.

Further, in the present invention included is a stage seven filtration being a cation exchange resin fluid filter having a stage seven filtration fluid filter inlet and a stage seven filtration fluid filter outlet, wherein the stage seven filtration fluid filter inlet is in a ninth fluid communication with the stage six filtration fluid filter outlet, the stage seven filtration cation exchange resin fluid filter is a color indicating acid cation resin polystyrenic gel with divinybenzene, hydrogen form being a sixteen mesh by fifty mesh or two-hundred ninety seven micron to eleven-hundred ninety micron being operational to functionally help remove minerals or cationic constituents that include but are not limited to barium, cadmium, copper, lead, calcium, and magnesium. Also included is a stage eight filtration being a first ultraviolet light module having a first ultraviolet light module inlet and a first ultraviolet light module outlet, wherein the first ultraviolet light module inlet is in a tenth fluid communication with said stage seven filtration fluid filter outlet, the stage eight filtration first ultraviolet light module includes an integral flow switch that activates said first ultraviolet light module with fluid flow and deactivates said first ultraviolet light module without fluid flow, the first ultraviolet light module is operational to functionally help remove pathogens. Further, a stage nine filtration being a mineral cartridge module having a mineral cartridge module inlet and a mineral cartridge module outlet, wherein the mineral cartridge module inlet is in an eleventh fluid communication with the stage eight ultraviolet light module outlet, the mineral cartridge module is operational to help raise the fluid pH and alkalinity The present invention also includes a structural framework formed into a skeletal parallelepiped shape that is defined as an outer boundary of the structural framework, the structural framework further comprising a plurality of cross beams that are disposed completely within the skeletal parallelepiped shape, a combination of the plurality of cross beams and the skeletal parallelepiped shape structurally support the frustro-conical replaceable filter media element matching frustro-conical housing, the influent vessel, the fluid flow sensor, the fluid pump and motor combination, the control circuitry, the stage two filtration fluid filter, the stage three filtration fluid filter, the stage four filtration, the stage five filtration, the stage six filtration, the stage seven filtration, the stage eight filtration, and the stage nine filtration are all disposed within the skeletal parallelepiped shape.

Next, included in the present invention is a purified fluid container that is removably engageable to the structural framework, the purified fluid container having an inlet port that has a removably engageable interface that is in a twelfth fluid communication with the mineral cartridge module outlet, the purified fluid container having a completely removed state from the structural framework, the purified fluid container operationally facilitating remote storage of the purified fluid container being filled with the purified fluid, further the purified fluid container having an installed state wherein the purified fluid container is engaged into the structural framework such that positionally the purified fluid container is completely disposed within the skeletal parallelepiped shape along with the frustro-conical replaceable filter media element matching frustro-conical housing, the influent vessel, the fluid flow sensor, the fluid pump and motor combination, the control circuitry, the stage two filtration fluid filter, the stage three filtration fluid filter, the stage four filtration, the stage five filtration, the stage six filtration, the stage seven filtration, the stage eight filtration, and the stage nine filtration that are all disposed within the skeletal parallelepiped shape, wherein the skeletal parallelepiped shape with the fluid treatment system apparatus disposed completely within, is a completely open framework that facilitates visual monitoring, data collection, and control of the fluid treatment system apparatus from outside of the skeletal parallelepiped shape by a user.

These and other objects of the present invention will become more readily appreciated and understood from a consideration of the following detailed description of the exemplary embodiments of the present invention when taken together with the accompanying drawings, in which;

BRIEF DESCRIPTION OF DRAWINGS

FIG. 17 is an opposing side elevation view of FIG. 16, wherein FIG. 17 shows the structural framework that is formed into the skeletal parallelepiped shape wherein the fluid treatment system apparatus is disposed within the structural framework, as shown the fluid treatment system apparatus includes the influent vessel, the purified fluid container, the control circuitry, and the stages one, two, seven, and eight fluid filtration elements;

FIG. 19 shows an opposing end view to FIG. 18, wherein FIG. 19 shows the structural framework that is formed into the skeletal parallelepiped shape wherein the fluid treatment system apparatus is disposed within the structural framework, as shown the fluid treatment system apparatus includes the influent vessel, the control circuitry, and the fluid flow sensor;

DETAILED DESCRIPTION OF THE INVENTION

Figure 1:
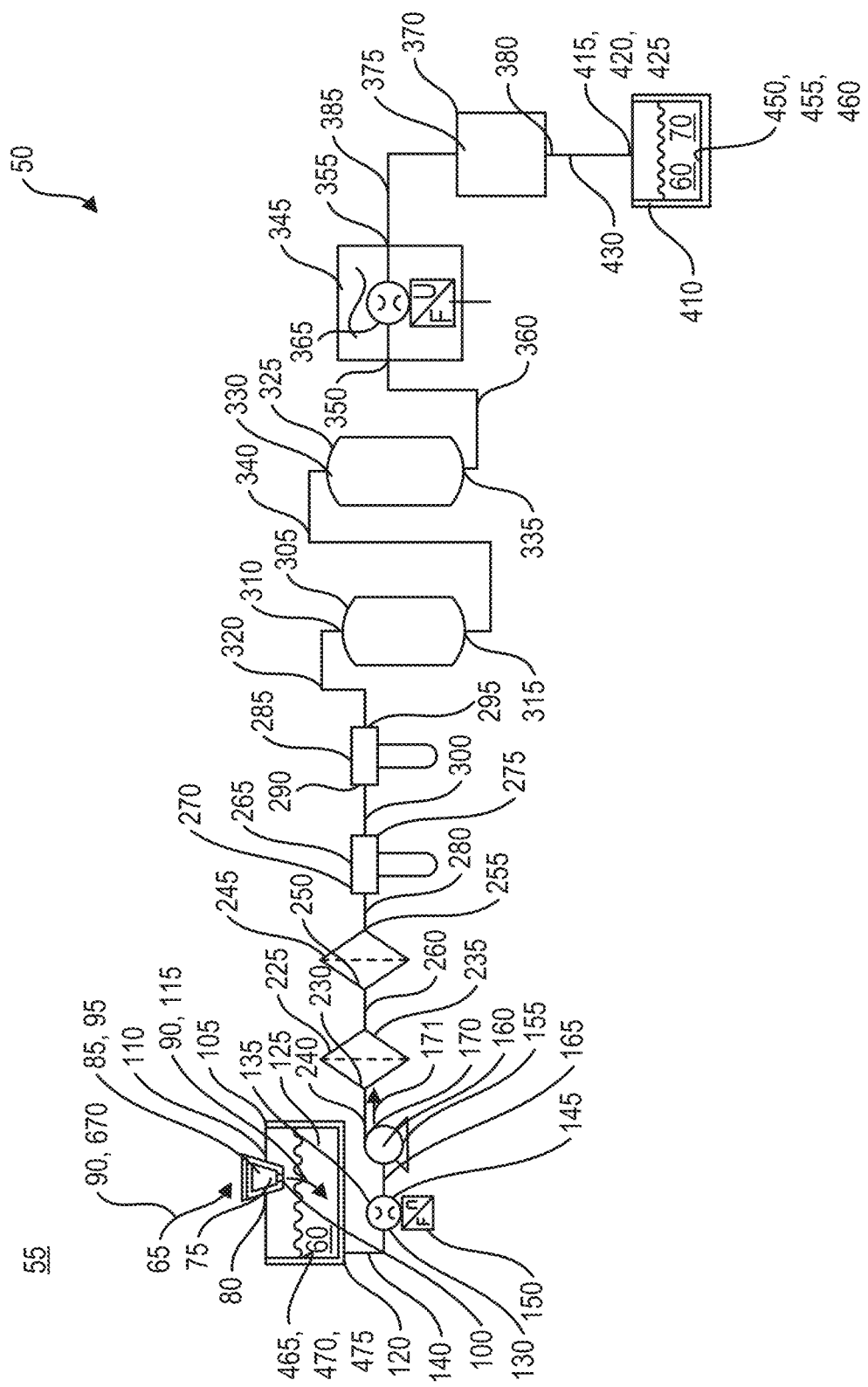
FIG. 1 shows a fluid schematic view of the self-contained modular decentralized point of use fluid treatment system apparatus that broadly includes the influent vessel, the purified fluid container, the fluid flow sensor, the fluid pump/motor combination, and stages one, two, three, four, five, six, seven, eight, and nine fluid filtration.

50 A self-contained modular decentralized point of use fluid treatment system apparatus
55 Open atmosphere environment
60 Fluid
65 Raw fluid 60 state
70 Purified fluid 60 state
75 Frustro-conical replaceable filter media element
80 Matching frusto-conical housing
81 Lid of frusto-conical housing 80
85 Upwardly facing diverging environmentally open 55 to the atmosphere 55 primary inlet reservoir
90 Gravity induced converging fluid filtration of the raw fluid 65
95 Stage one fluid filtration being the frustro-conical replaceable filter media element
100 Convergent gravity feed outlet
105 Influent vessel
110 Upper influent vessel 105 inlet
115 First fluid communication after the stage one fluid filtration 95
120 Lower influent vessel 105 outlet
125 Internal volume of the influent vessel 105
130 Fluid flow sensor
135 Inlet of the fluid flow sensor 130

140 Second fluid communication
145 Outlet of the fluid flow sensor 130
150 Electrical signal output of the fluid flow sensor 130
151 Perceptible output of the fluid flow sensor 130
155 Fluid pump and motor combination
160 Inlet of the fluid pump and motor combination 155
165 Third fluid communication
170 Outlet of the fluid pump and motor combination 155
171 Flow form the fluid pump and motor combination 155
175 Control circuitry
180 First electrical communication
185 Input of the control circuitry 175
190 Second electrical communication
195 Manually selectable switch
200 Produce a plurality of event marker signals by the control circuitry 175
205 Electrical relay
210 Third electrical communication
215 First function of a manual fluid pump and motor combination 155 activation
220 Second function of a manual fluid pump and motor combination 155 deactivation
225 Stage two filtration fluid filter
230 Inlet of the stage two filtration fluid filter 225
235 Outlet of the stage two filtration fluid filter 225
240 Fourth fluid communication
245 Stage three filtration fluid filter
250 Inlet of the stage three filtration fluid filter 245
255 Outlet of the stage three filtration fluid filter 245
260 Fifth fluid communication
265 Stage four filtration fluid filter being an activated granular carbon adsorption fluid filter
270 Inlet of the stage four filtration fluid filter 265
275 Outlet of the stage four filtration fluid filter 265
280 Sixth fluid communication
285 Stage five filtration fluid filter being an activated granular carbon adsorption fluid filter
290 Inlet of the stage five filtration fluid filter 285
295 Outlet of the stage five filtration fluid filter 285
300 Seventh fluid communication
305 Stage six filtration fluid filter being a anion exchange resin fluid filter
310 Inlet of the stage six filtration fluid filter 305
315 Outlet of the stage six filtration fluid filter 305
320 Eighth fluid communication
325 Stage seven filtration fluid filter being a cation exchange resin fluid filter
330 Inlet of the stage seven filtration fluid filter 325
335 Outlet of the stage seven filtration fluid filter 325
340 Ninth fluid communication
345 Stage eight filtration fluid filter being a first ultraviolet light module fluid filter
350 Inlet of the stage eight filtration fluid filter 345
355 Outlet of the stage eight filtration fluid filter 345
360 Tenth fluid communication
365 Integral flow switch of the stage eight filtration fluid filter 345
370 Stage nine filtration fluid filter being a mineral cartridge module fluid filter
371 pH test strip and kit for the stage nine filtration fluid filter 370
372 Instructions on use of pH Test Kit 371 and pH Test Strips 371, although this pH has a secondary Maximum Contaminant Level (MCL), it cannot be enforced by the Environmental Protection Agency (EPA), regardless, the user needs to be instructed that if the pH is below 6.0, that the valve 729 immediately upstream of the purified fluid container 410 needs to be throttled back to ensure more Empty Bed Contact Time in the mineral cartridge 370, (if the pH is greater than 9.0 the user should contact the supplier or manufacturer as increasing flow to reduce pH may have deleterious effects on EBCT for system processes which are implemented to ensure compliance with the Primary Drinking Water Regulations).
375 Inlet of the stage nine filtration fluid filter 370
380 Outlet of the stage nine filtration fluid filter 370
385 Eleventh fluid communication
390 Structural framework formed into a skeletal parallelepiped shape
395 Outer boundary of the structural framework 390
396 Plurality of longwise beams of the structural framework 390
400 Plurality of cross beams of the structural framework 390
401 Plurality of planar surfaces disposed within the skeletal parallelepiped shape 390
405 Combination of the plurality of cross beams 400 and the skeletal parallelepiped shape 390 structurally support the frustro-conical replaceable filter media element 75, the matching frustro-conical housing 80, the influent vessel 105, the fluid flow sensor 130, the fluid pump and motor combination 155, the control circuitry 175, the stage two filtration fluid filter 225, the stage three filtration fluid filter 245, the stage four filtration 265, the stage five filtration 285, said stage six filtration 305, said stage seven filtration 325, the stage eight filtration 345, and the stage nine filtration 370 are all disposed within the skeletal parallelepiped shape 390
410 Purified fluid container
411 Graduated lines disposed upon the purified fluid container 410, the line separation is preferably to be about five percent (5%) of the purified fluid container 410 volumetric capacity
415 Removably engageable interface of the purified fluid container 410
420 Inlet port of the purified fluid container 410
425 Removable interface of the inlet port 420
430 Twelfth fluid communication
435 Completely removed state of the purified fluid container 410 from the structural framework 390 skeletal parallelepiped shape
440 Completely installed state of the purified fluid container 410 completely disposed within the structural framework 390 skeletal parallelepiped shape
445 Completely visually open framework of the skeletal parallelepiped shape from the structural framework 390 that facilitates visual monitoring, data collection, and control of the fluid treatment system apparatus 50 from outside of the skeletal parallelepiped shape 390 by a user
450 Inner surface of the purified fluid container 410
455 Anti-microbial coating disposed on the inner surface 450
460 Contact of the purified fluid 70 with the inner surface 450 anti-microbial coating 455
465 Interior surface of the influent vessel 105
470 Anti-microbial coating disposed on the interior surface 465
475 Contact of the raw fluid 65 after the stage one filtration 95 with the interior surface 465 anti-microbial coating 470
480 Means for a gas pressure source 485 Disposed position of the means 480 at the upwardly facing diverging environmentally open to the atmosphere 55 primary inlet reservoir 85
490 Substantially fluid tight first gas communication with the primary inlet reservoir 85
495 Push of the fluid 60 therethrough the fluid treatment system apparatus 50 from the raw fluid state 65 to the purified fluid state 70 via the means 480 or means 665
500 Thirteenth fluid communication that acts as a bypass as between the fluid pump and motor combination 155 inlet 160 and outlet 170
505 First check valve on the fluid pump and motor combination 155 inlet 160
506 First isolation valve for the first check valve 505
507 First directional flow control backup valve for the first check valve 505
510 Disposed position of the first check valve 505 in the thirteenth fluid communication 500 adjacent to inlet 160 only allowing fluid 60 flow 171, 495 away from the inlet 160
515 Second check valve on the fluid pump and motor combination 155 outlet 170
516 Second isolation valve for the second check valve 515
517 Second directional flow control backup valve for the second check valve 515
520 Disposed position of the second check valve 515 in the thirteenth fluid communication 500 adjacent to outlet 170 only allowing fluid 60 flow 171, 495 away from the outlet 170
525 Structure to have the influent vessel 105 be removably engageable to the structural framework 390
530 Structure to have the influent vessel 105 lower outlet 120 be removably engageable to an interface disposed within the second fluid communication 140
535 Completely removed state of the influent vessel 105 from the structural framework 390
540 Completely installed state of the influent vessel 105 into the structural framework 390
545 Position of the influent vessel 105 completely disposed within the structural framework 390 skeletal parallelepiped shape
550 Wall of the of the purified fluid container 410
555 First aperture disposed within the wall 550 of the purified fluid container 410
560 Positioned vertically adjacent of the first aperture 555 to the inlet port 420 of the purified fluid container 410
565 Overflow connector that is in fluid communication to the first aperture 555
570 Discharge tube that forms a fourteenth fluid communication from the first aperture 555 and overflow connector 565 to a fluid drain to prevent damage to the purified fluid container 410 being overfilled with the purified fluid 70
575 Plurality of differential pressure sensors
580 Perceptible output of each of the differential pressure sensors 575
585 Stage ten filtration fluid filter being a second ultraviolet light module fluid filter
590 Inlet of the stage ten filtration fluid filter 585
595 Outlet of the stage ten filtration fluid filter 585
600 Fourteenth fluid communication
605 Integral flow switch of the stage ten filtration fluid filter 585
610 Stage eleven filtration fluid filter being a third ultraviolet light module fluid filter for ultraviolet disinfection
615 Inlet of the stage eleven filtration fluid filter 610
620 Outlet of the stage eleven filtration fluid filter 610
625 Fifteenth fluid communication
630 Integral flow switch of the stage eleven filtration fluid filter 610
635 Chlorine disinfectant residual test kit
640 Chlorine test strips
645 Instructions for using the chlorine disinfectant residual test kit 635, being instructions to test for an absence of chlorine in the purified fluid 70 to confirm efficacy of the activated carbon absorption fluid filters 265, 285, further instructions on setting the fluid pump and motor combination 155 volumetric flowrate as indicated from the fluid flow sensor 130 outlet 145, 150, 151 having an initial volumetric flowrate in the range of approximately ten percent to approximately twenty five percent of a batch volume of the raw fluid 65 to operationally facilitate a selected empty bed contact time (EBCT) of the fluid 60 as the fluid 60 is processed therethrough said self-contained modular decentralized point of use fluid treatment system apparatus 50
650 Bleach kit
660 Instructions for using the bleach kit 650 being instructions to add, agitate, and have dwell time of additional chlorine from the bleach 650 to the purified fluid 70 in the event of the first 345 or second 585 or third 610 ultraviolet light modules potentially experiencing a failure, further using the chlorine disinfectant residual test kit 635 including the chlorine test strips 640 to test for a desired chlorine level in the purified fluid 70 and potentially repeating the instructions 660, thus additional bleach 650 must be added to ensure adequate disinfection by adding about 1 ml (about 10 drops from a typical household eyedropper) of household bleach 650 (typically about 5.250% available chlorine) to 2 gallons from the purified fluid 70 container 410, robustly stirring it, and letting the bleach 650 react with the purified fluid 70 for 15 minutes, the chorine disinfectant residual test kit 635 can then be used to test the chlorine residual and a residual of 1-3 mg/l should be indicated, if it is below 0.5 mg/l, another 1 ml of bleach should be added, and the process repeated, as many times as it takes, until a residual of 1-3 mg/l is measured
665 Means for accommodating a utility fluid pressure source 666
666 Utility pressure source
670 Initial fluid communication
675 Perceptible output of each of the plurality of differential pressure sensors 575
680 Compressor for the means for a gas pressure source 480
685 Accumulator for the means for a gas pressure source 480
690 Piston movable in a cylinder for the means for a gas pressure source 480
695 Bladder for the means for a gas pressure source 480
700 Pressure tank for the means for a gas pressure source 480
705 5 VDC power supply
710 12 VDC power supply
715 First flow bypass for the influent vessel 105
720 Fluid communication to pressure tank 700
725 Fluid communication to Stage 5 filtration 285
729 Control valve for the purified fluid container 410
730 Second bypass for the purified fluid container 410

731 Control valve for the second bypass 730
735 Purified fluid 60, 70 outlet to a purified fluid/water system
740 Fluid communication from the Stage 7 filtration 325

With initial reference to FIG. 1 shown is a fluid schematic view of the self-contained modular decentralized point of use fluid treatment system apparatus 50 that broadly includes the influent vessel 105, the purified fluid container 410, the fluid flow sensor 130, the fluid pump/motor combination 155, and stages; one 95, two 225, three 245, four 265, five 285, six 305, seven 325, eight 345, and nine 370 fluid filtration.

Figure 2:
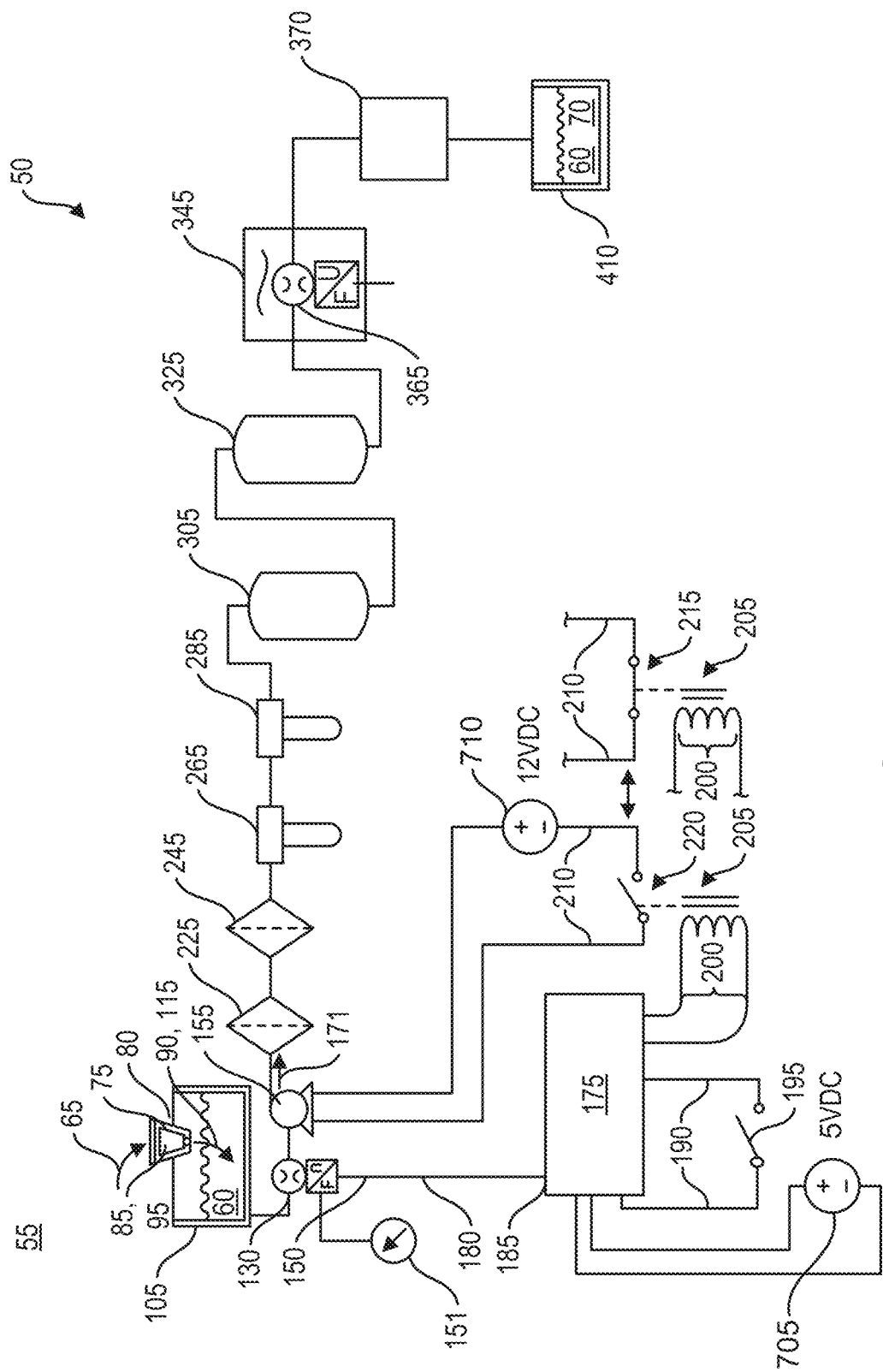
FIG. 2 shows what in included in FIG. 1, with the addition of the control circuitry that includes the 5-volt power supply, the 12-volt power supply, the switch, all in order to control the fluid pump/motor combination activation and deactivation as determined from the fluid flow sensor.

Next, FIG. 2 shows what in included in FIG. 1, with the addition of the control circuitry 175 that includes the 5-volt power supply 705, the 12-volt power supply 710, the switch 195, all in order to control the fluid pump/motor combination 155 activation 215 and deactivation 220 as determined from the fluid flow sensor 130.

Figure 3:
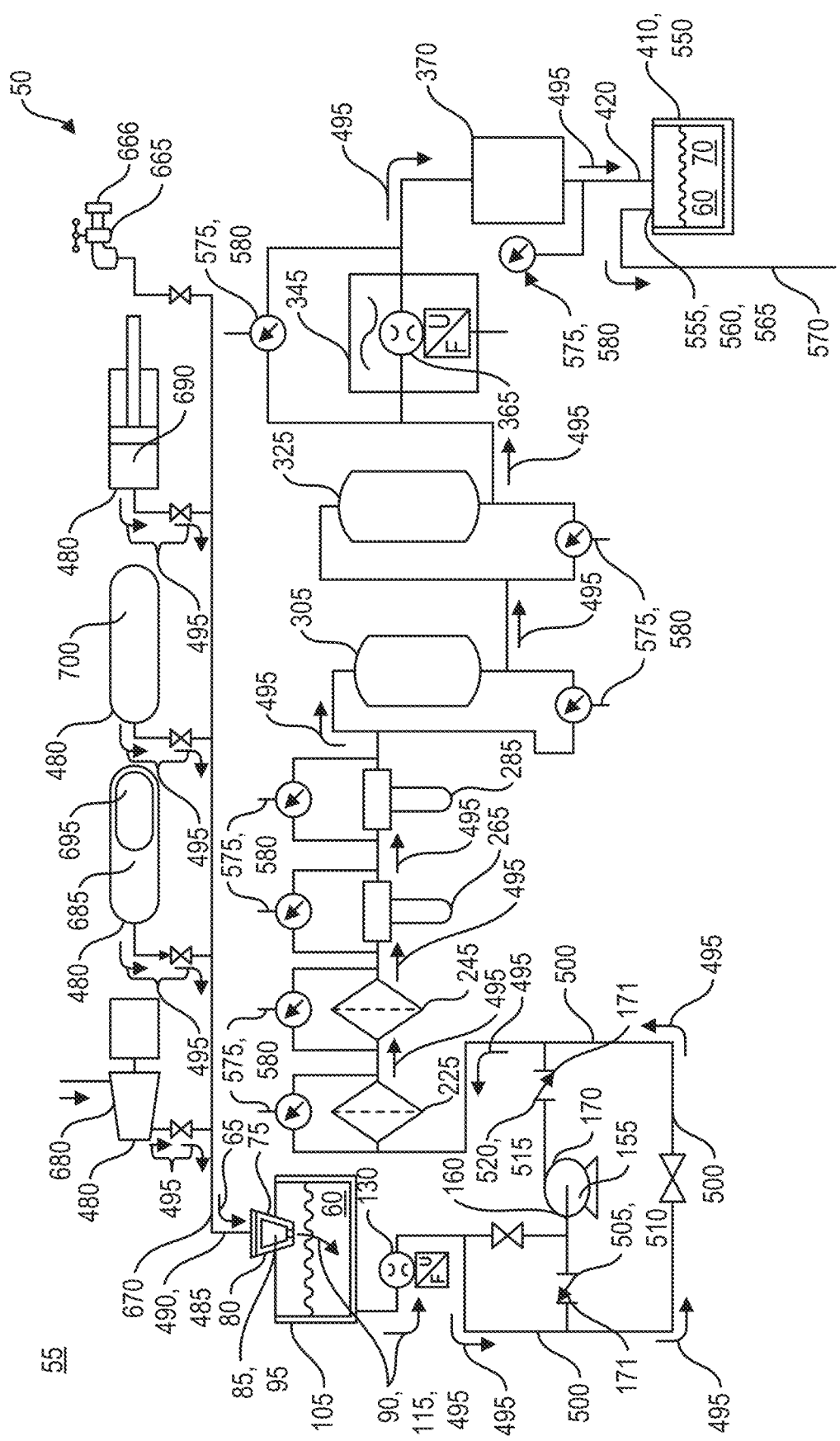
FIG. 3 shows what is included in FIG. 1, with the addition of a means for a gas pressure source or a means for a means for accommodating a utility fluid pressure source that are to feed the self-contained modular decentralized point of use fluid treatment system apparatus as shown in FIG. 1, having the additional options of a bypass for the fluid pump/motor combination as the means for a gas pressure source or the means for a means for accommodating a utility fluid pressure source that can substitute for the fluid pump/motor combination to move the fluid to be treated through the fluid treatment system apparatus.

Continuing, FIG. 3 shows what is included in FIG. 1, with the addition of a means for a gas pressure source 480 or a means for a means for accommodating a utility fluid pressure source 665 that are to feed the self-contained modular decentralized point of use fluid treatment system apparatus 50 as shown in FIG. 1, having the additional options of a bypass 495 for the fluid pump/motor combination 155 as the means for a gas pressure source 480 or the means for a means for accommodating a utility fluid pressure source 665 that can substitute for the fluid pump/motor combination 155 to move the fluid to be treated 60 therethrough the fluid treatment system apparatus 50.

Figure 4:
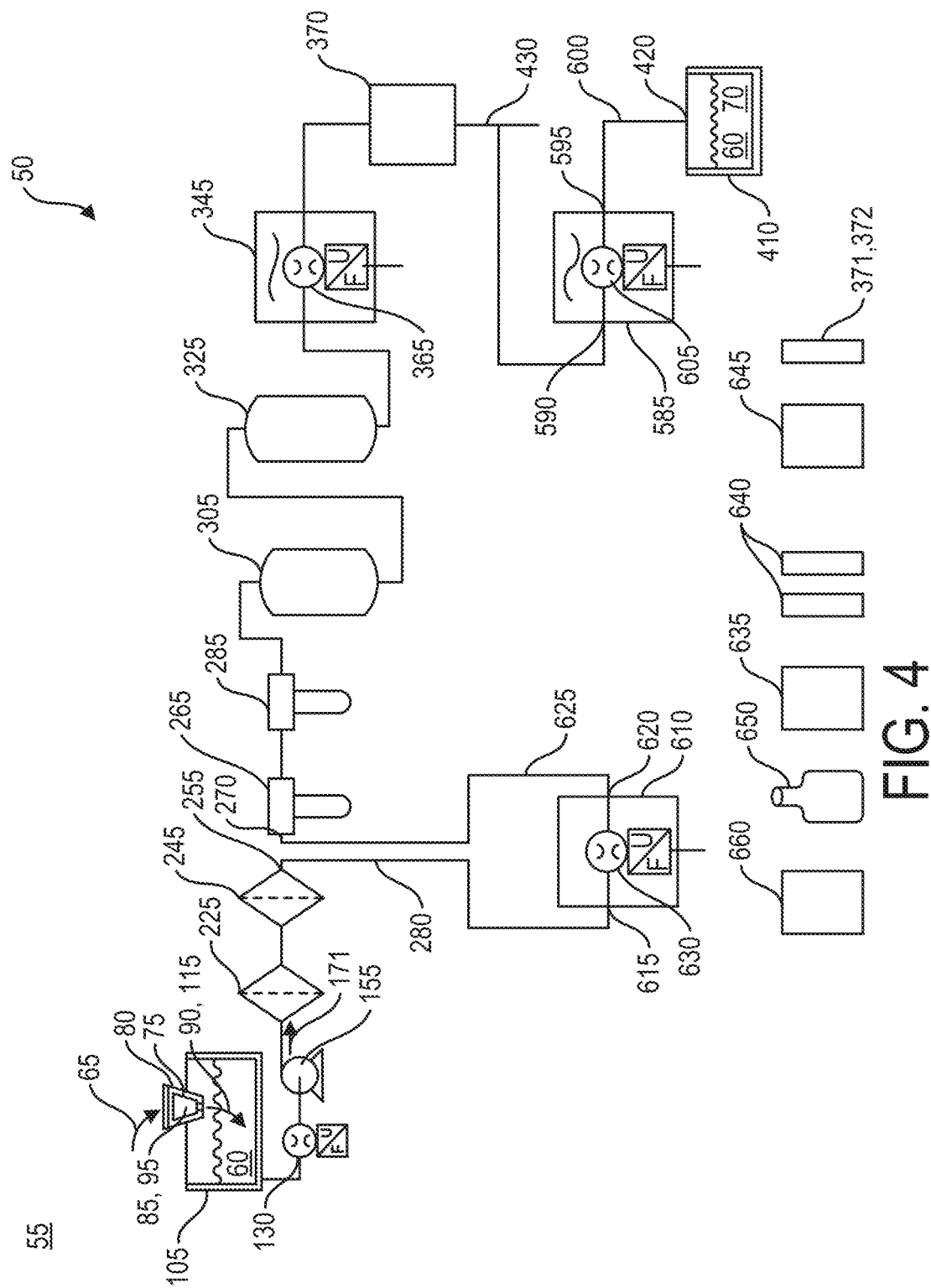
FIG. 4 shows what is included in FIG. 1, with the addition of the stage ten filtration and the integral stage ten filter fluid flow switch and the stage eleven filtration and the integral stage eleven filter fluid flow switch, further shown in FIG. 4 are the accessories of the chlorine disinfectant residual test kit, chlorine test strips, chlorine test kit instructions, bleach, and instructions for using the bleach kit.

Further, FIG. 4 shows what is included in FIG. 1, with the addition of the stage ten filtration 585 and the integral stage ten filter fluid flow switch 605 and the stage eleven filtration 610 and the integral stage eleven filter fluid flow switch 630, further shown in FIG. 4 are the accessories of the chlorine disinfectant residual test kit 635, chlorine test strips 640, chlorine test kit instructions 645, bleach kit 650, and instructions 660 for using the bleach kit 650.

Figure 5:
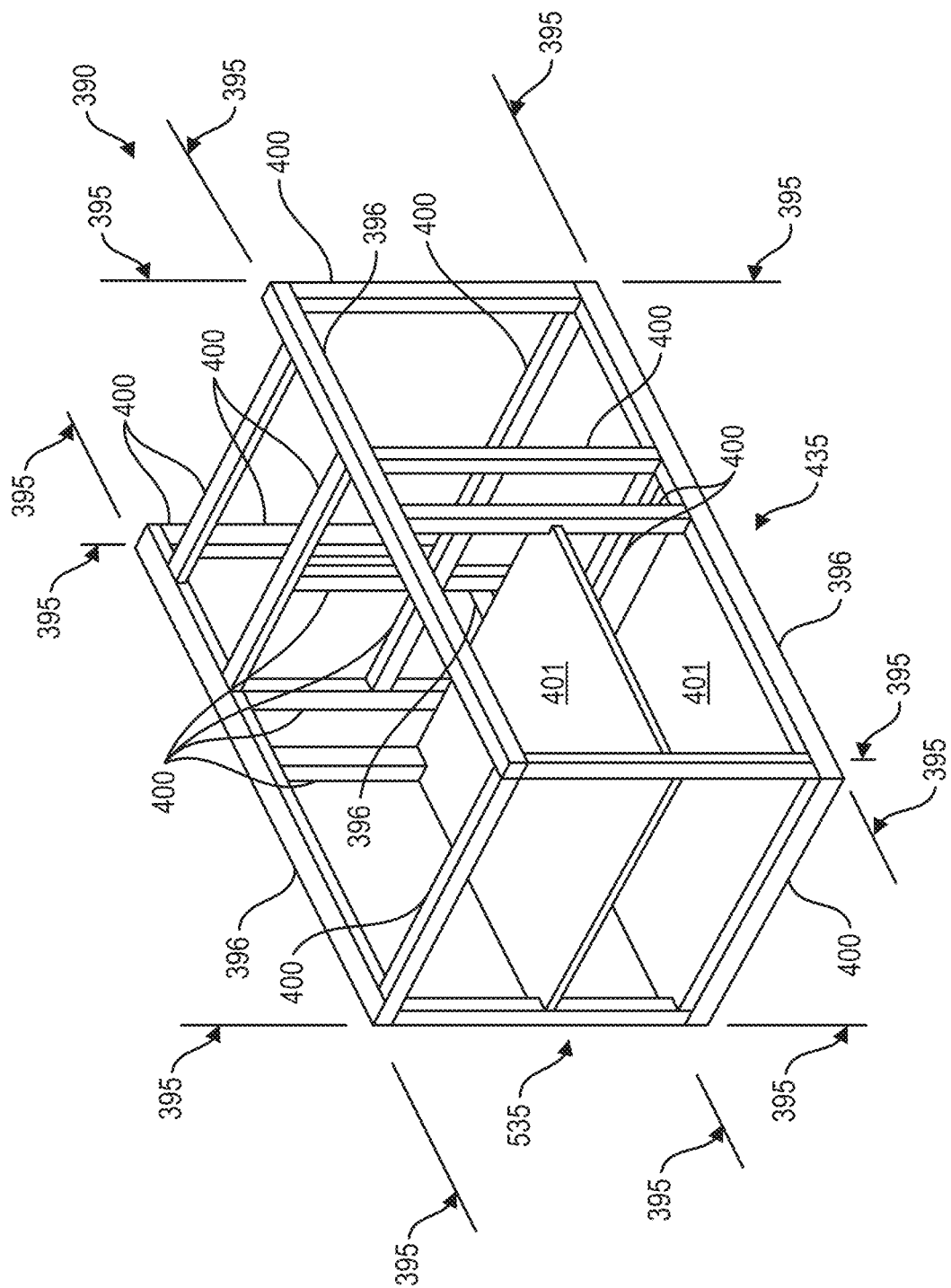
FIG. 5 shows an upper perspective view of the structural framework that is formed into a skeletal parallelepiped shape wherein the fluid treatment system apparatus is disposed within.

Moving onward, FIG. 5 shows an upper perspective view of the structural framework 390 that is formed into a skeletal parallelepiped shape wherein the fluid treatment system apparatus 50 is disposed within.

Figure 6:
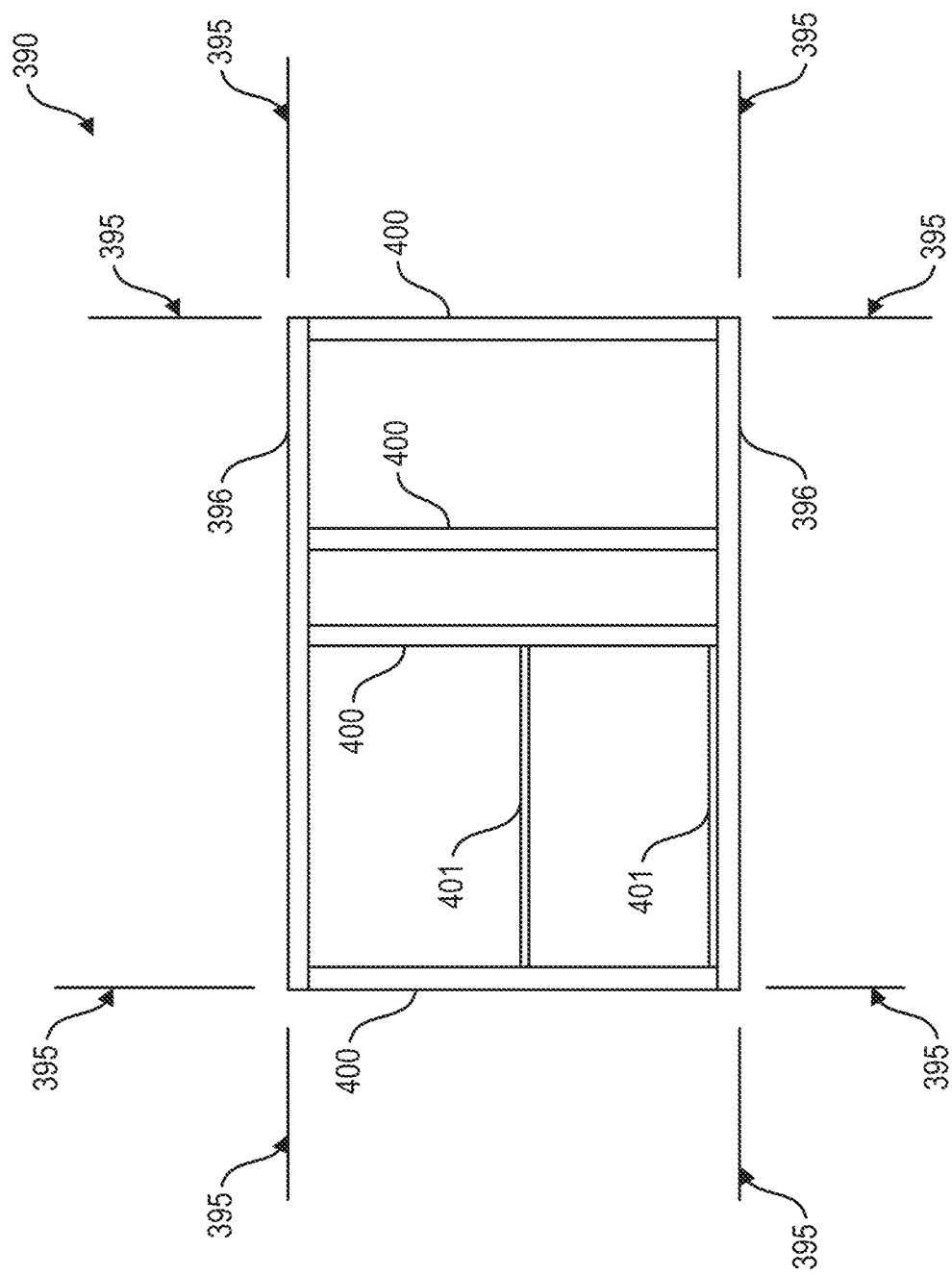
FIG. 6 shows a side elevation view of the structural framework that is formed into a skeletal parallelepiped shape that includes the plurality of longwise beams, the plurality of cross beams, and the plurality of planar surfaces.

Next, FIG. 6 shows a side elevation view of the structural framework 390 that is formed into the skeletal parallelepiped shape that includes the plurality of longwise beams 396, the plurality of cross beams 400, and the plurality of planar surfaces 401.

Figure 7:
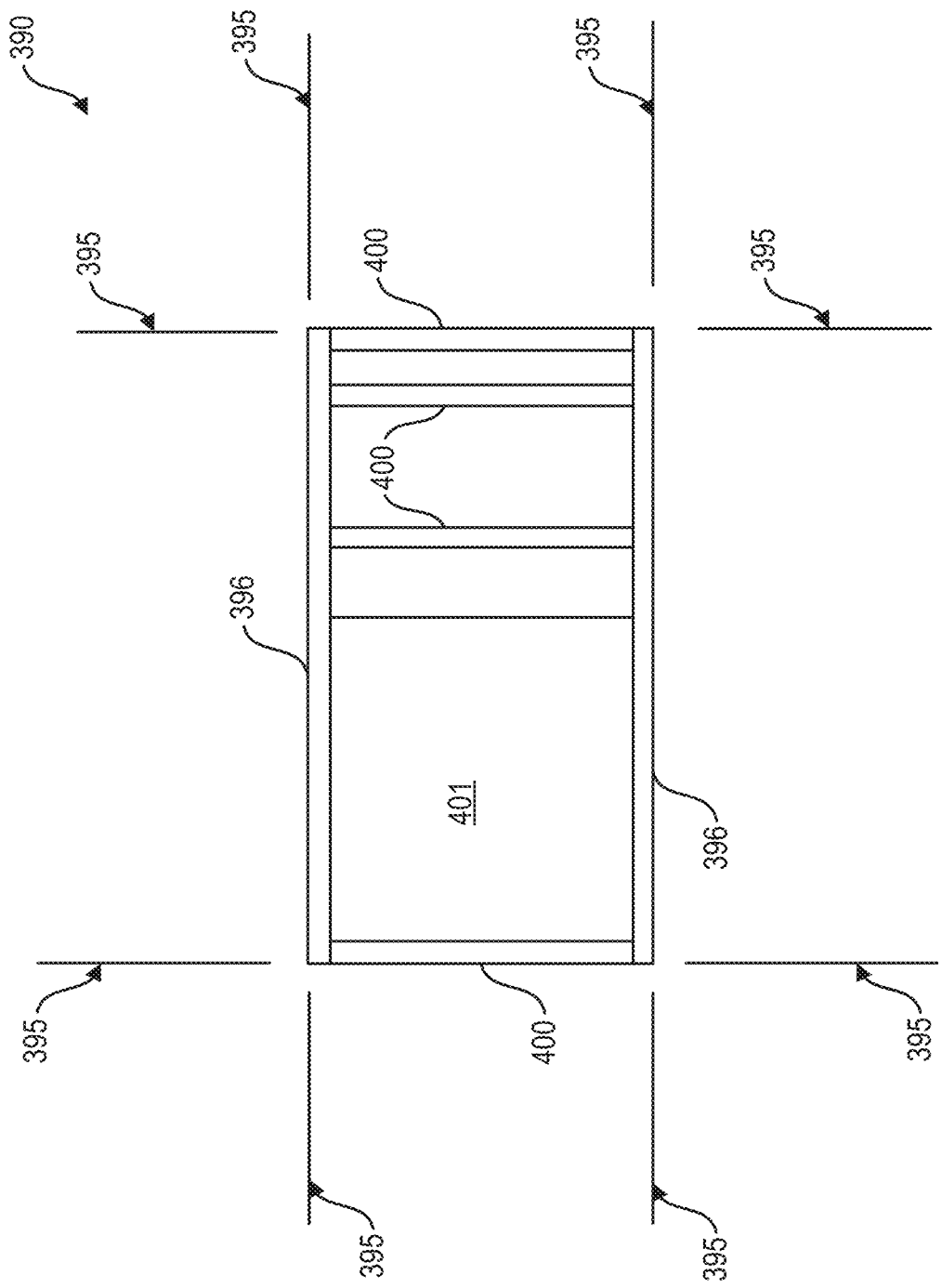
FIG. 7 shows a top view of the structural framework that is formed into a skeletal parallelepiped shape that includes the plurality of longwise beams, the plurality of cross beams, and the upper planar surface.

Continuing, FIG. 7 shows a top view of the structural framework 390 that is formed into a skeletal parallelepiped shape that includes the plurality of longwise beams 396, the plurality of cross beams 400, and the upper planar surface 401.

Figure 8:
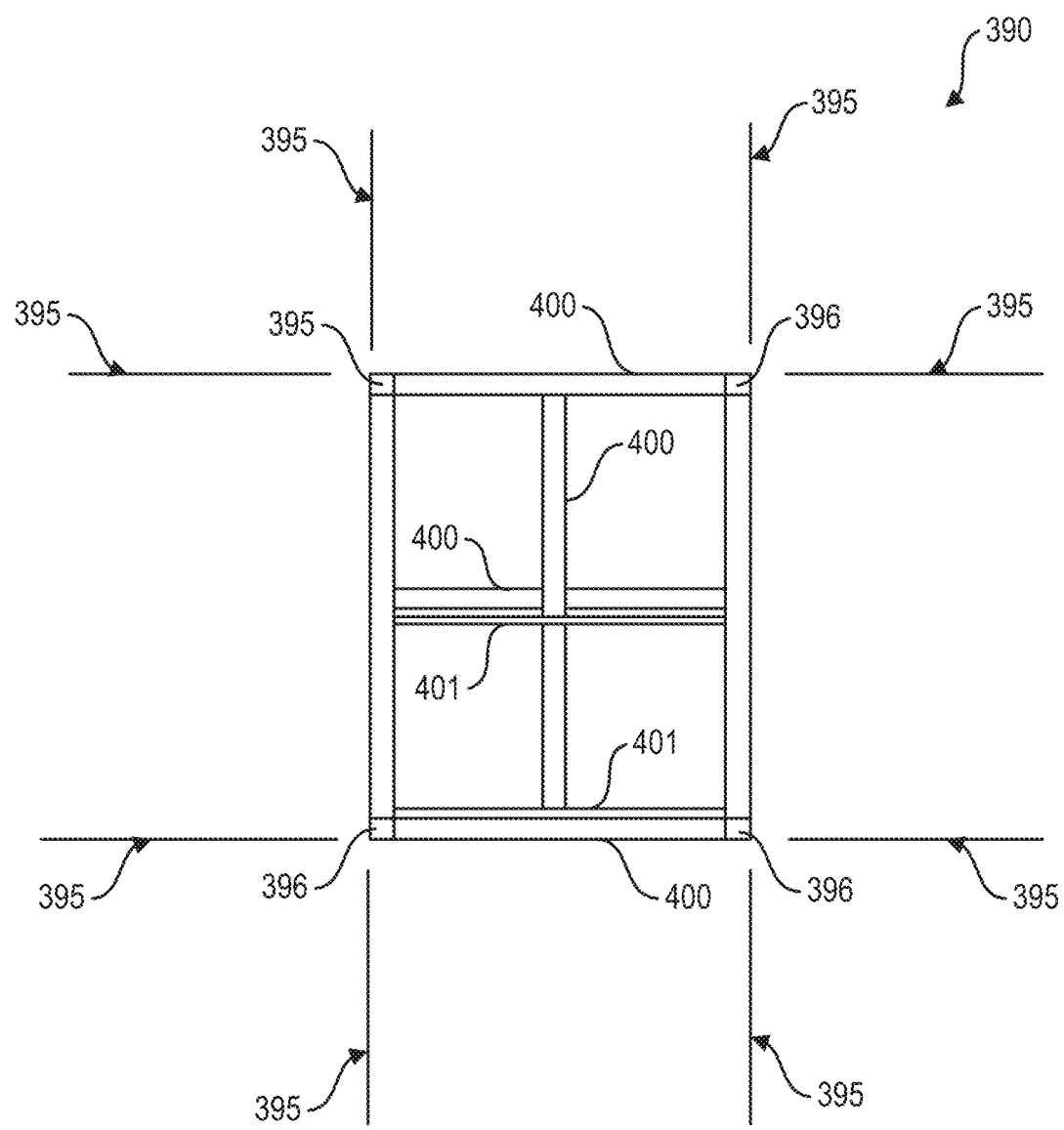
FIG. 8 shows an end view of the structural framework that is formed into a skeletal parallelepiped shape that includes the plurality of longwise beams, the plurality of cross beams, and the plurality of planar surfaces.

Moving onward, FIG. 8 shows an end view of the structural framework 390 that is formed into a skeletal parallelepiped shape that includes the plurality of longwise beams 396, the plurality of cross beams 400, and the plurality of planar surfaces 401.

Figure 9:
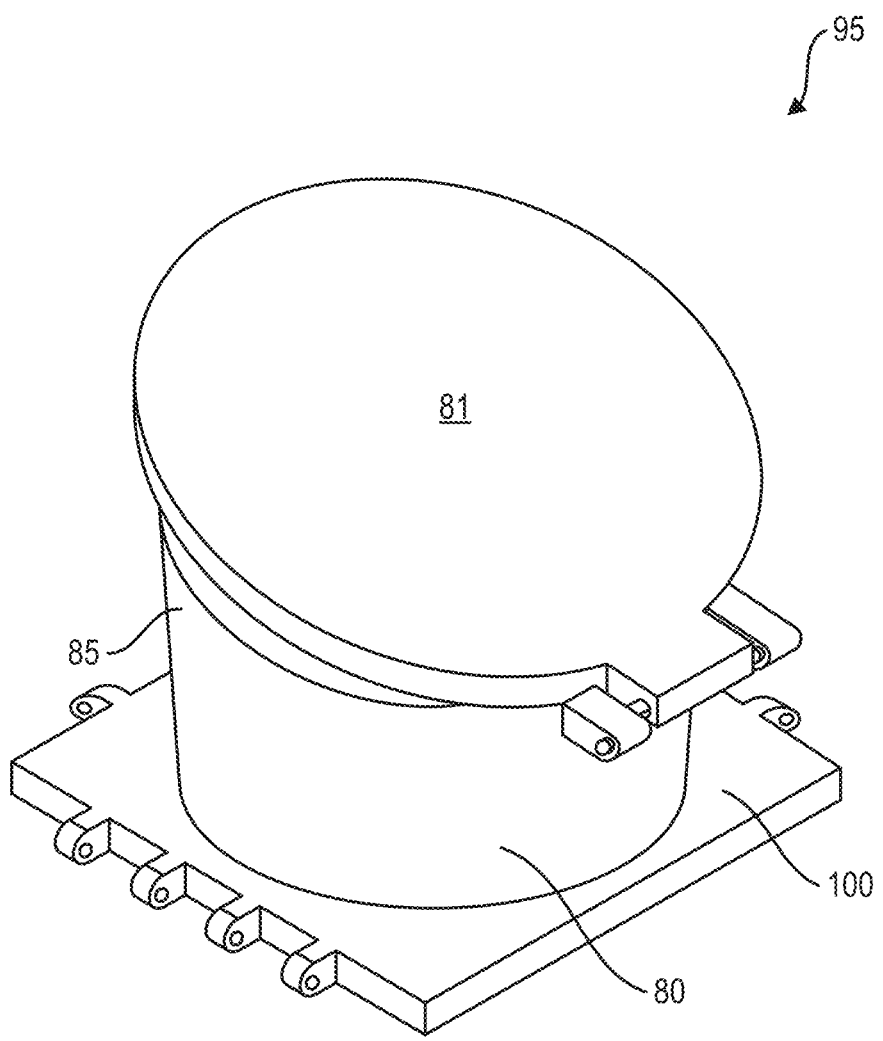
FIG. 9 shows an upper perspective view of the stage one filtration including the frustro-conical housing, the lid, and the convergent gravity feed outlet.
Figure 10:
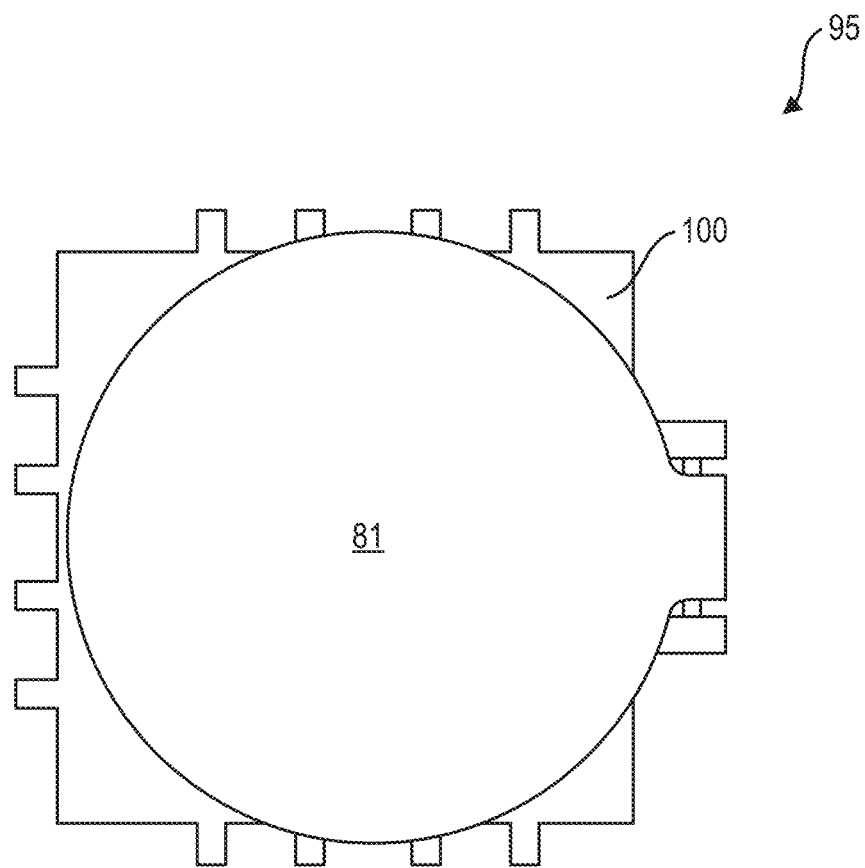
FIG. 10 shows a top view of the stage one filtration including the lid and the convergent gravity feed outlet.

Next, FIG. 9 shows an upper perspective view of the stage one filtration 95 including the frustro-conical housing 80, the lid 81, and the convergent gravity feed outlet 100;

Further, FIG. 10 shows a top view of the stage one filtration 95 including the lid 81 and the convergent gravity feed outlet 100.

Figure 11:
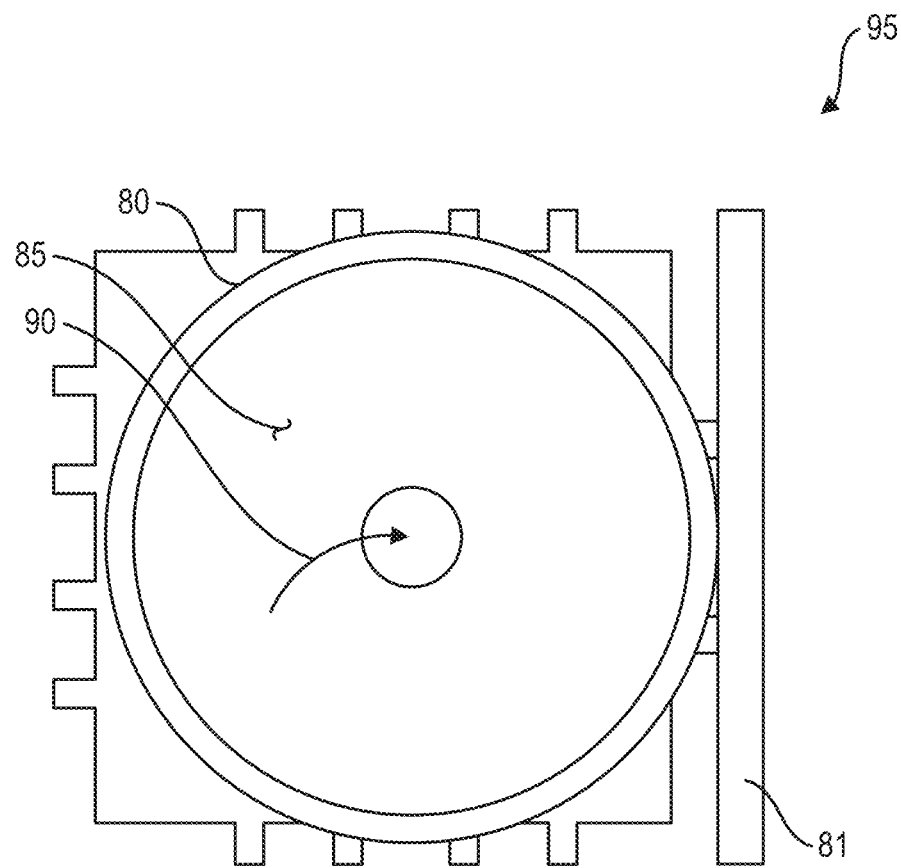
FIG. 11 shows a top view of the stage one filtration including the lid that is pivoted into an open state, plus the matching frustro-conical housing, the upwardly facing diverging environmentally open to the atmosphere primary inlet reservoir, and the gravity induced converging fluid filtration of the raw fluid.

Moving ahead, FIG. 11 shows a top view of the stage one filtration 95 including the lid 81 that is pivoted into an open state, plus the matching frustro-conical housing 80, the upwardly facing diverging environmentally open to the atmosphere primary inlet reservoir 85, and the gravity induced converging fluid filtration of the raw fluid 90.

Figure 12:
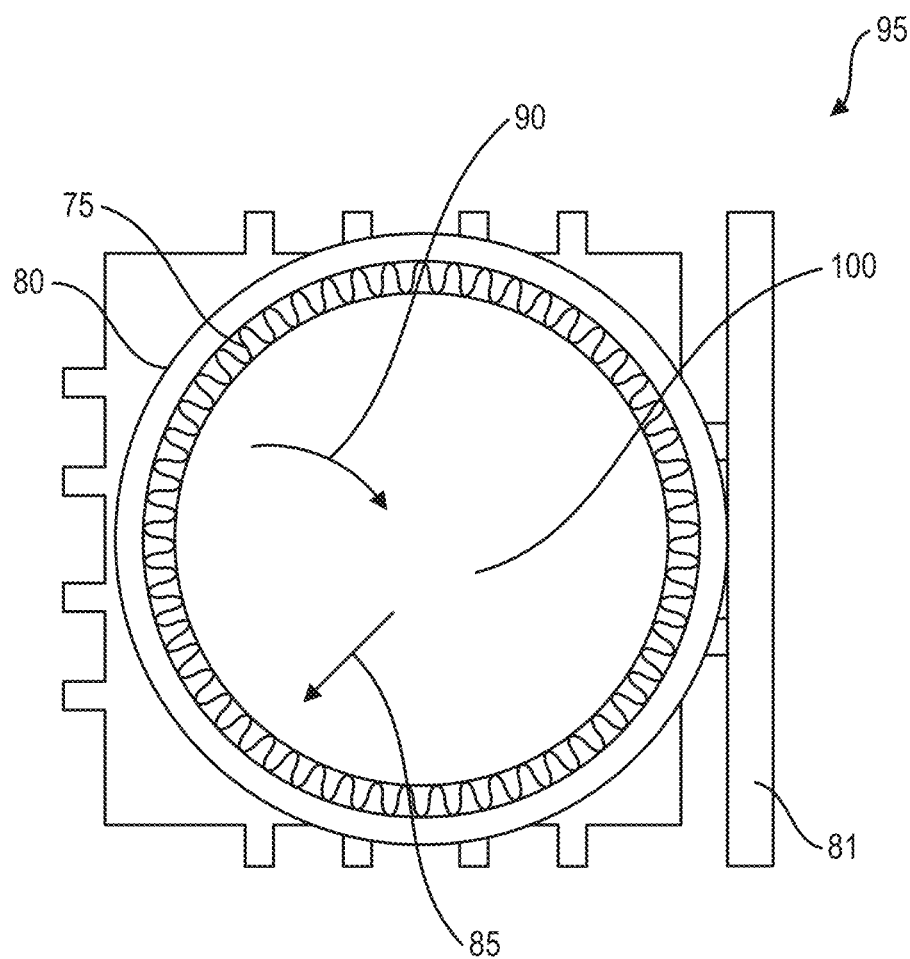
FIG. 12 shows the FIG. 11 view, with FIG. 12 showing the addition of the frustro-conical replaceable filter media element that is disposed within the matching frustro-conical housing forming the upwardly facing diverging environmentally open to the atmosphere primary inlet reservoir with the frustro-conial replaceable filter media element as a liner resulting in the gravity induced converging fluid filtration of the raw fluid.

Continuing, FIG. 12 shows the FIG. 11 view with the addition of the frustro-conial replaceable filter media element 75 that is disposed within the matching frustro-conical housing 80 forming the upwardly facing diverging environmentally open to the atmosphere primary inlet reservoir 85 with the frustro-conial replaceable filter media element 75 as a liner resulting in the gravity induced converging fluid filtration of the raw fluid 90.

Figure 13:
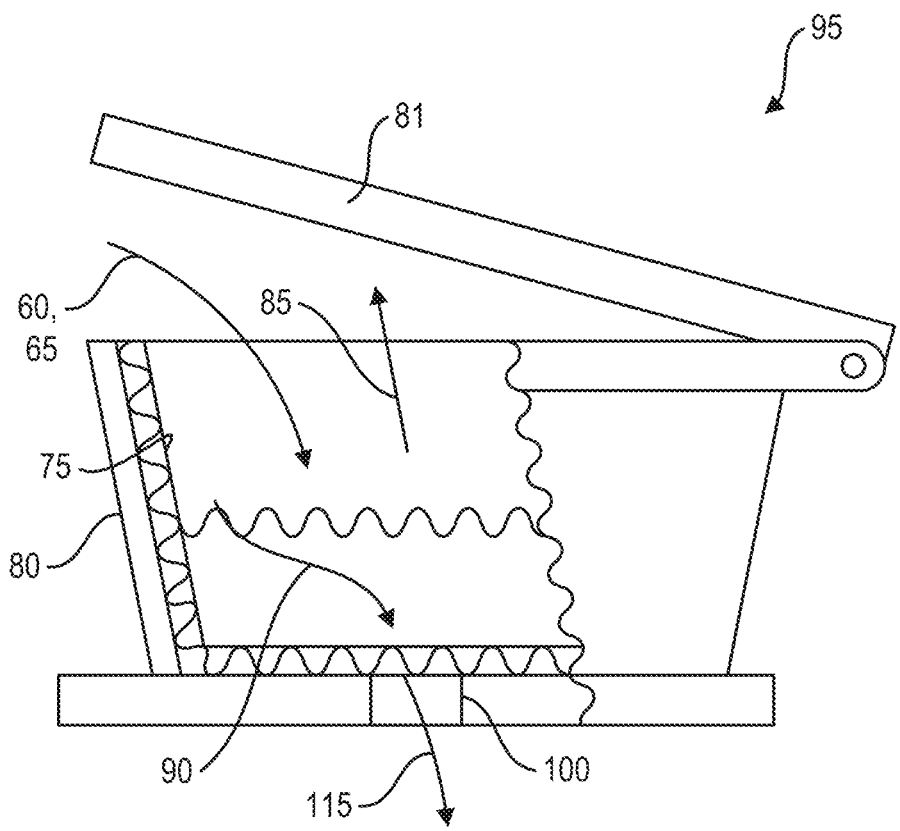
FIG. 13 shows a side elevation cross sectional view of the stage one filtration including the lid that is pivoted into a partially open state, plus the matching frustro-conical housing, the upwardly facing diverging environmentally open to the atmosphere primary inlet reservoir, and the gravity induced converging fluid filtration of the raw fluid with the frustro-conial replaceable filter media element lining the matching frustro-conical housing resulting in the first fluid communication after the stage one fluid filtration therethrough the convergent gravity feed outlet.

Next, FIG. 13 shows a side elevation cross sectional view of the stage one filtration 95 including the lid 81 that is pivoted into a partially open state, plus the matching frustro-conical housing 80, the upwardly facing diverging environmentally open to the atmosphere primary inlet reservoir 85, and the gravity induced converging fluid filtration of the raw fluid 90 with the frustro-conical replaceable filter media element 75 lining the matching frustro-conical housing 80 resulting in the first fluid communication 115 after the stage one fluid filtration 95 therethrough the convergent gravity feed outlet 100.

Figure 14:
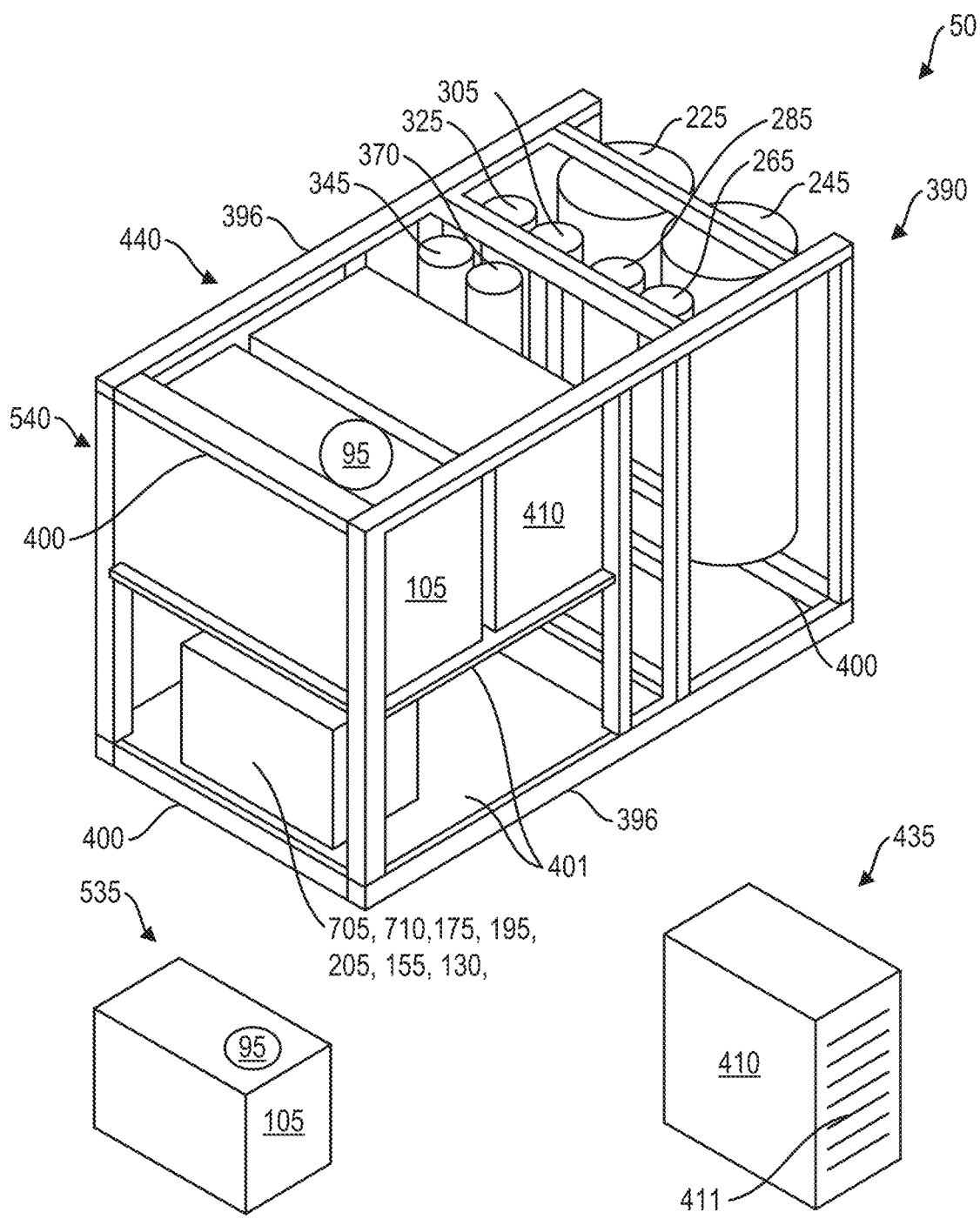
FIG. 14 shows an upper perspective view of the structural framework that is formed into the skeletal parallelepiped shape wherein the fluid treatment system apparatus is disposed within the structural framework, as shown the fluid treatment system apparatus includes the influent vessel, the purified fluid container, the control circuitry, and the stages one, two, three, four, five, six, seven, eight, and nine fluid filtration elements.

Further, FIG. 14 shows an upper perspective view of the structural framework 390 that is formed into the skeletal parallelepiped shape wherein the fluid treatment system apparatus 50 is disposed within the structural framework, as shown the fluid treatment system apparatus 50 includes the influent vessel 105, the purified fluid container 410, the control circuitry 175, and the stages one 95, two 225, three 245, four 265, five 285, six 305, seven 325, eight 345, and nine 370 fluid filtration elements.

Figure 15:
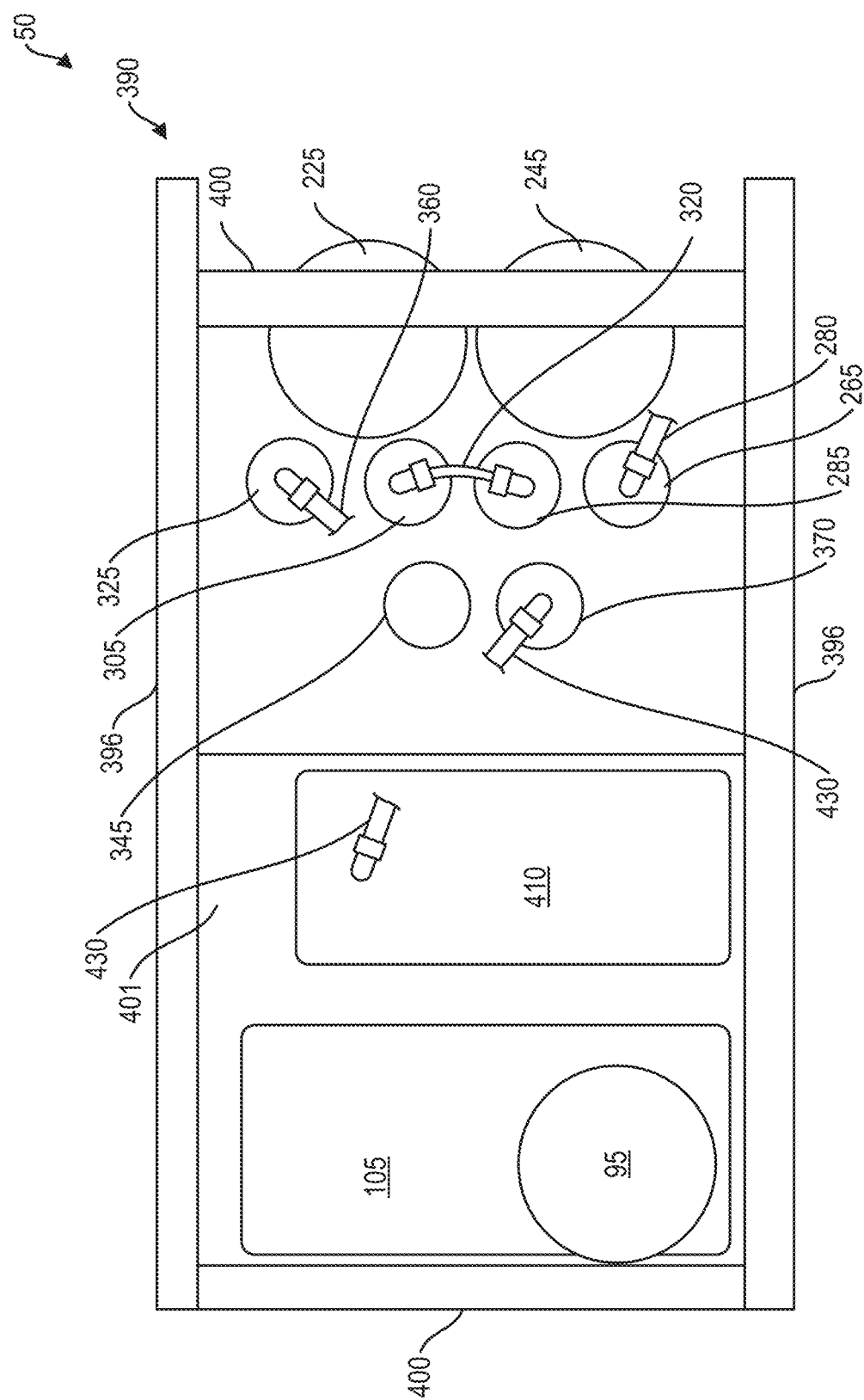
FIG. 15 shows a top view of the structural framework that is formed into the skeletal parallelepiped shape wherein the fluid treatment system apparatus is disposed within the structural framework, as shown the fluid treatment system apparatus includes the influent vessel, the purified fluid container, the control circuitry, and the stages one, two, three, four, five, six, seven, eight, and nine fluid filtration elements.

Continuing, FIG. 15 shows a top view of the structural framework 390 that is formed into the skeletal parallelepiped shape wherein the fluid treatment system apparatus 50 is disposed within the structural framework, as shown the fluid treatment system apparatus 50 includes the influent vessel 105, the purified fluid container 410, and the stages one 95, two 225, three 245, four 265, five 285, six 305, seven 325, eight 345, and nine 370 fluid filtration elements.

Figure 16:
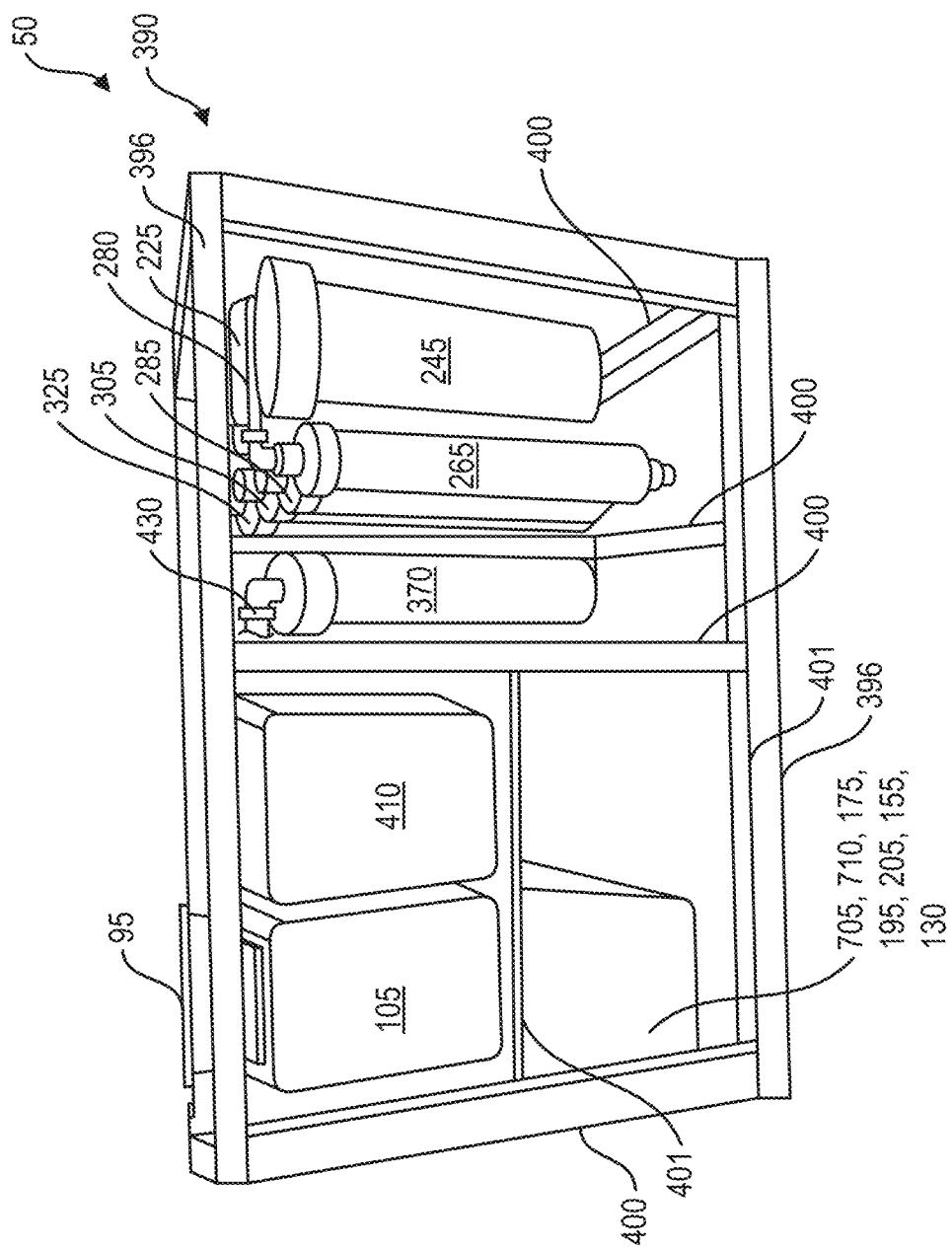
FIG. 16 shows a side elevation view of the structural framework that is formed into the skeletal parallelepiped shape wherein the fluid treatment system apparatus is disposed within the structural framework, as shown the fluid treatment system apparatus includes the influent vessel, the purified fluid container, the control circuitry, and the stages one, two, three, four, five, six, seven, and nine fluid filtration elements.

Next, FIG. 16 shows a side elevation view of the structural framework 390 that is formed into the skeletal parallelepiped shape wherein the fluid treatment system apparatus 50 is disposed within the structural framework, as shown the fluid treatment system apparatus 50 includes the influent vessel 105, the purified fluid container 410, the control circuitry 175, and the stages one 95, two 225, three 245, four 265, five 285, six 305, seven 325, and nine 370 fluid filtration elements.

Figure 17:
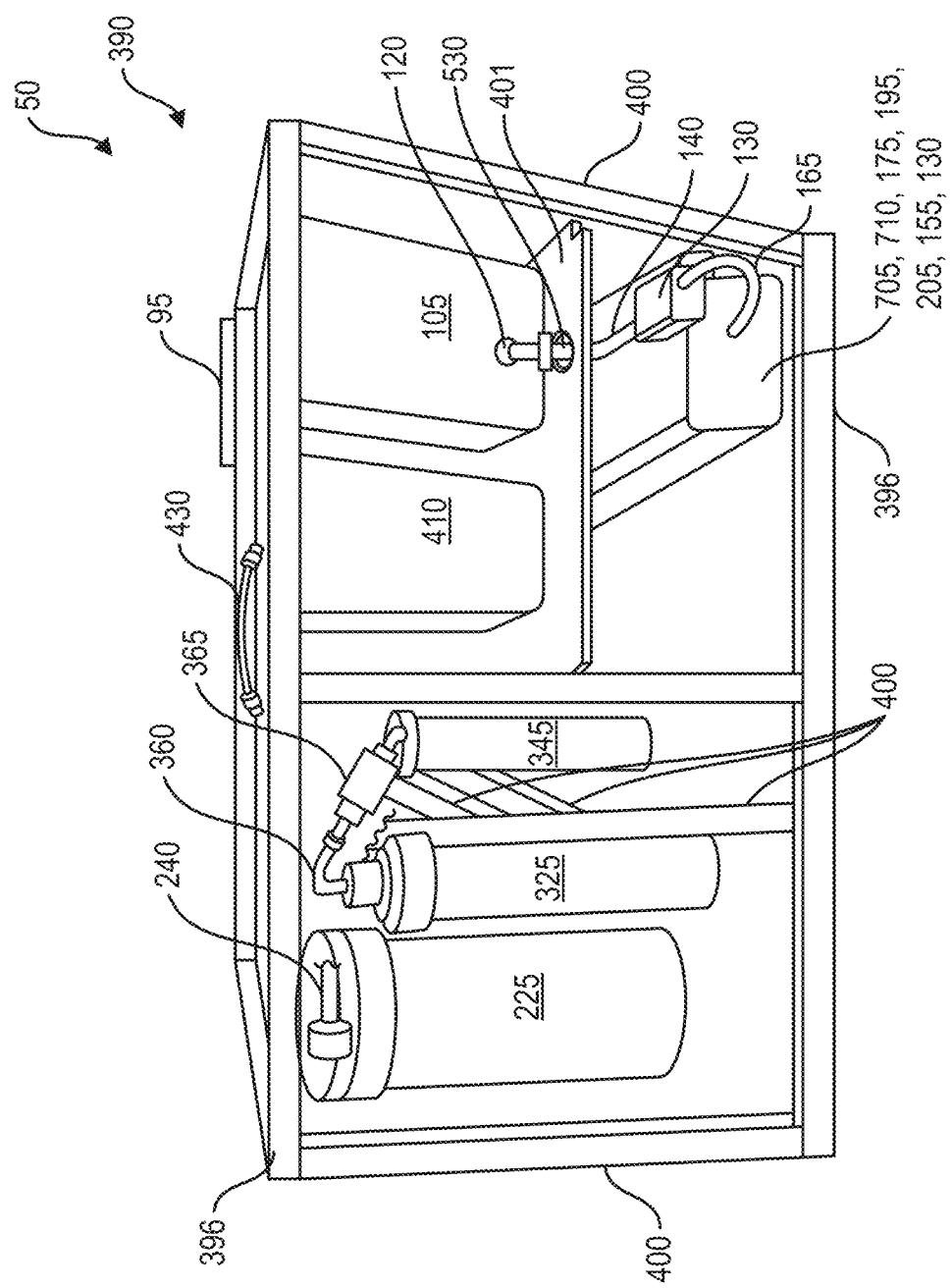

Further, FIG. 17 is an opposing side elevation view of FIG. 16, wherein FIG. 17 shows the structural framework 390 that is formed into the skeletal parallelepiped shape wherein the fluid treatment system apparatus 50 is disposed within the structural framework, as shown the fluid treatment system apparatus 50 includes the influent vessel 105, the purified fluid container 410, the control circuitry 175, and the stages one 95, two 225, seven 325, and eight 345 fluid filtration elements.

Figure 18:
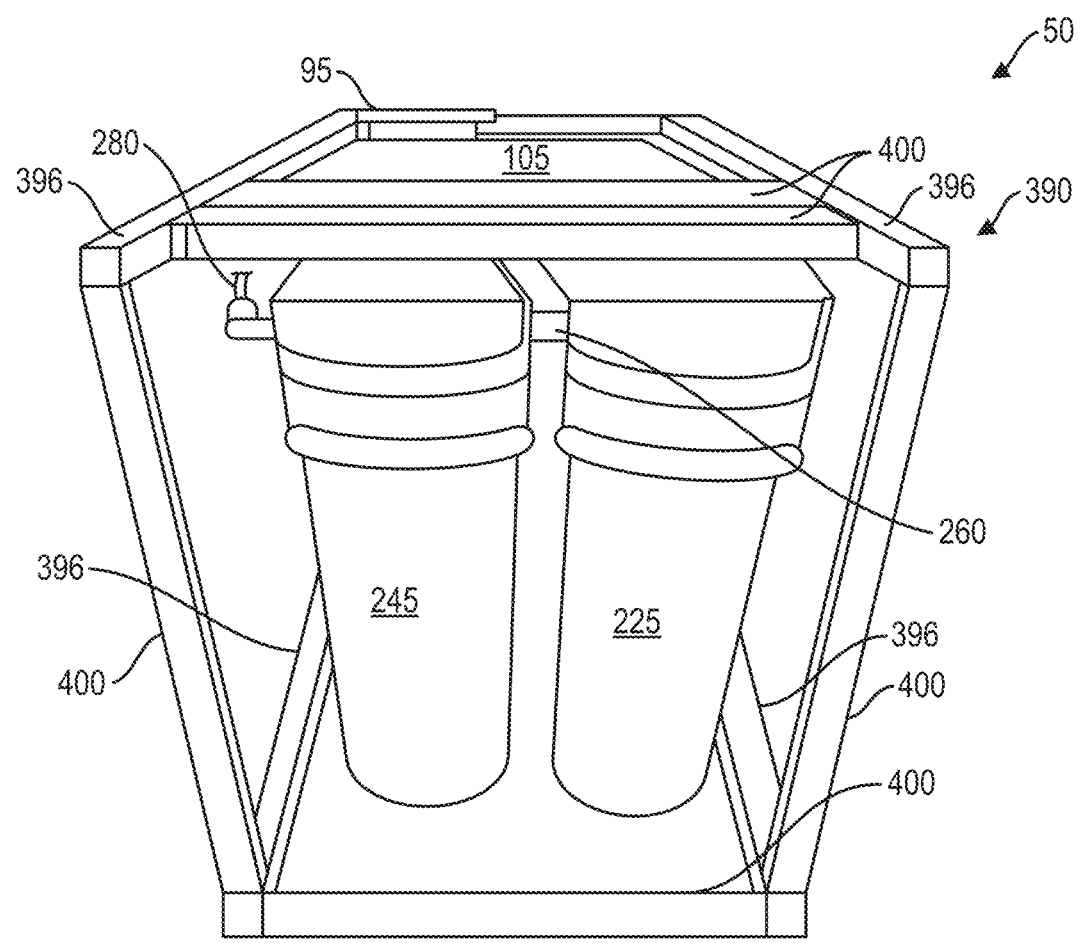
FIG. 18 shows an end elevation view of the structural framework that is formed into the skeletal parallelepiped shape wherein the fluid treatment system apparatus is disposed within the structural framework, as shown the fluid treatment system apparatus that includes the influent vessel, and the stages one, two, and three fluid filtration elements.

Moving onward, FIG. 18 shows an end elevation view of the structural framework 390 that is formed into the skeletal parallelepiped shape wherein the fluid treatment system apparatus 50 is disposed within the structural framework 390, as shown the fluid treatment system apparatus 50 that includes the influent vessel 105, and the stages one 95, two 225, and three 245 fluid filtration elements.

Figure 19:
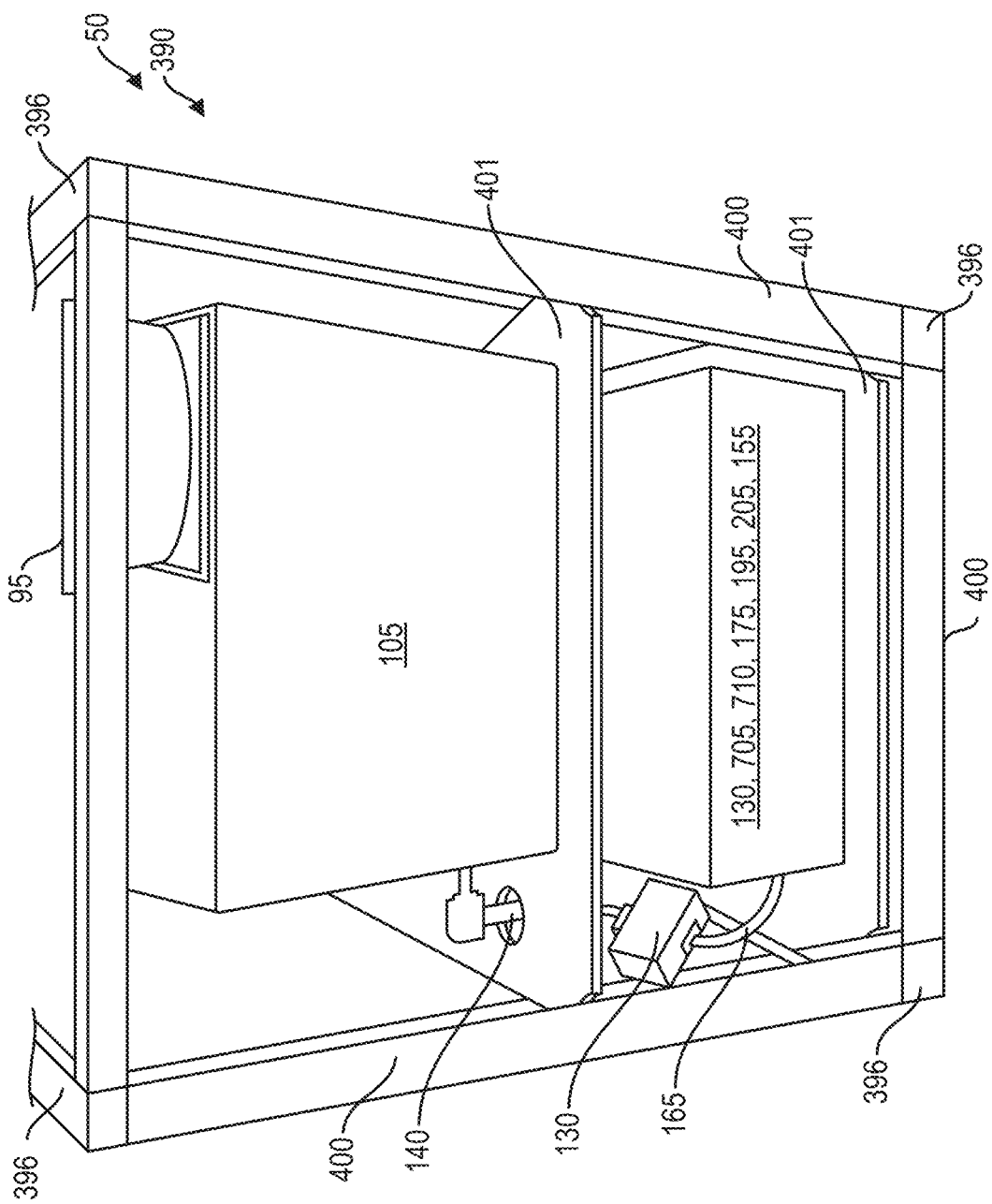

Continuing, FIG. 19 shows an opposing end view to FIG. 18, wherein FIG. 19 shows the structural framework 390 that is formed into the skeletal parallelepiped shape wherein the fluid treatment system apparatus 50 is disposed within the structural framework 390, as shown the fluid treatment system apparatus 50 includes the influent vessel 105, the control circuitry 175, and the fluid flow sensor 130.

Figure 20:
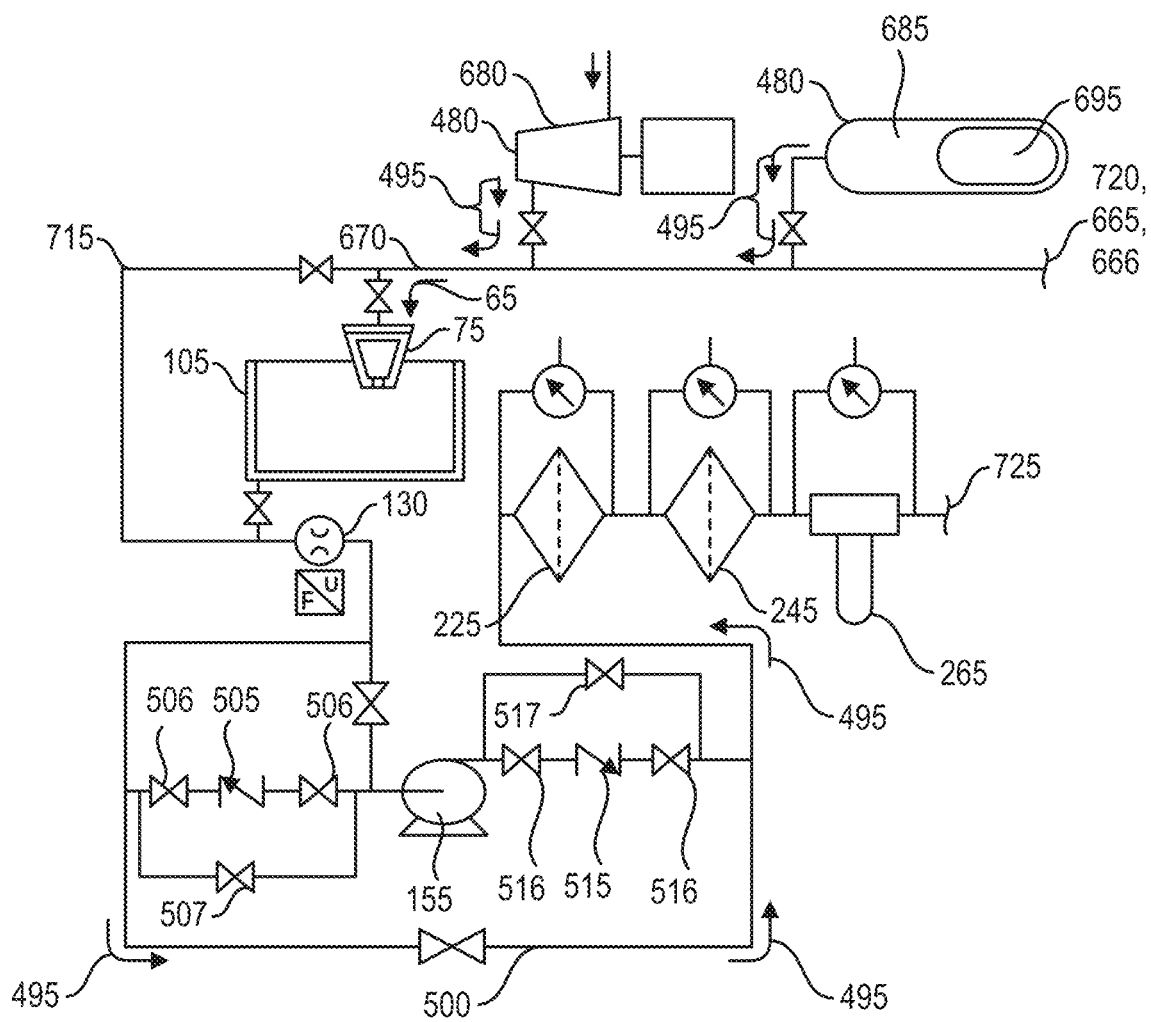
FIG. 20 shows a fluid schematic for a portion of what is included in FIG. 1, with the addition of the means for a gas pressure source or a means for a means for accommodating a utility fluid pressure source that are to feed the self-contained modular decentralized point of use fluid treatment system apparatus as shown in FIG. 20, further having the additional options of a first flow bypass for the influent vessel and a bypass for the fluid pump/motor combination as the means for a gas pressure source or the means for a means for accommodating a utility fluid pressure source that can substitute for the fluid pump/motor combination to move the fluid to be treated through the fluid treatment system apparatus, further in relation to FIG. 3, there are isolation valves and added bypass valves to accommodate check valve failure while still having the desired bypass around the fluid pump/motor combination.

Next, FIG. 20 shows a fluid schematic for a portion of what is included in FIG. 1, with the addition of the means 480 for a gas pressure source or a means for a means 665 for accommodating a utility fluid pressure source that are to feed the self-contained modular decentralized point of use fluid treatment system apparatus 50 as shown in FIG. 20, further having the additional options of a first flow bypass 715 for the influent vessel 105, a bypass 495 for the fluid pump/motor combination 155 as the means 480 for a gas pressure source or the means 665 for a means for accommodating a utility fluid pressure source that can substitute for the fluid pump/motor combination 155 to move the fluid 60 to be treated through the fluid treatment system apparatus 50, further in relation to FIG. 3, there are isolation valves 506, 516 and added bypass valves 507, 512 to accommodate check valve failure while still having the desired bypass around the fluid pump/motor combination 155.

Figure 21:
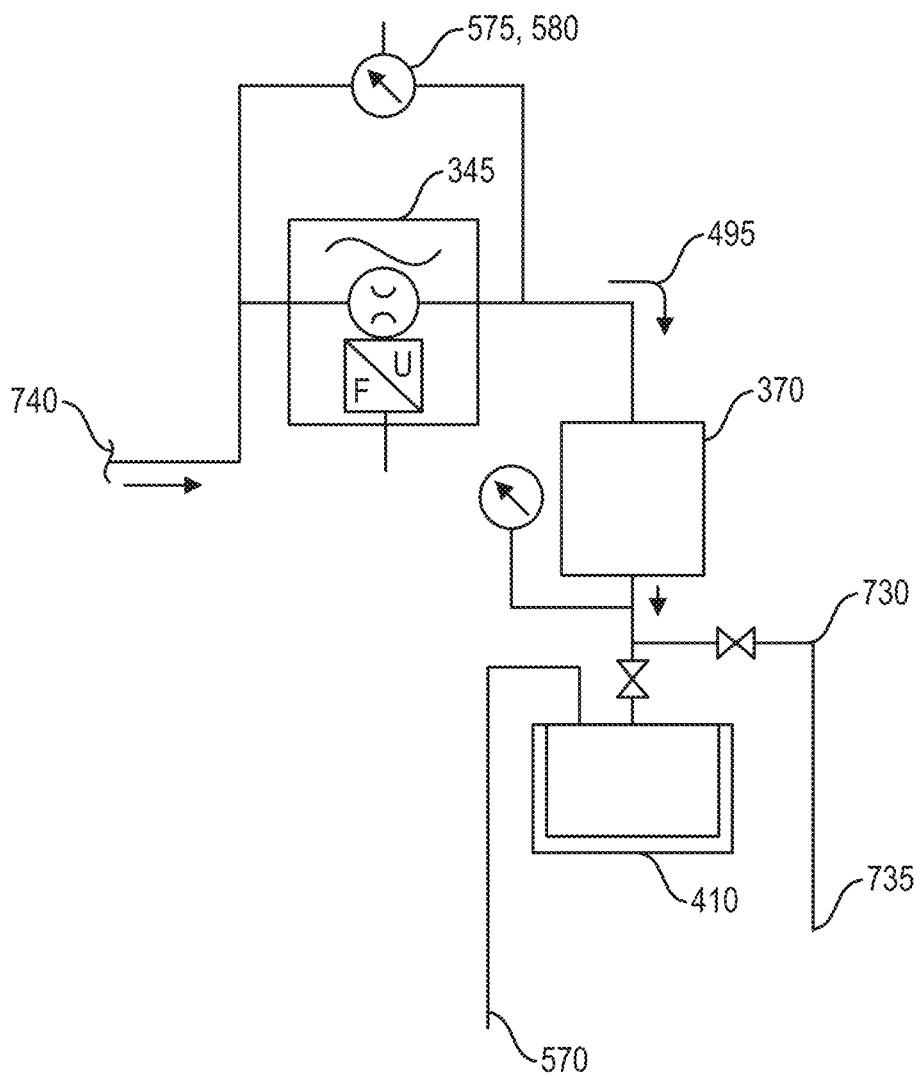
FIG. 21 shows a fluid schematic that shows a portion of the FIG. 1 fluid schematic that includes the stage eight filtration and the stage nine filtration, however, with the addition of a second bypass for the purified fluid container.

Further, FIG. 21 shows a fluid schematic that shows a portion of the FIG. 1 fluid schematic that includes the stage eight filtration 345 and the stage nine filtration 370, however, with the addition of a second bypass 730 for the purified fluid container 410.

Figure 22:
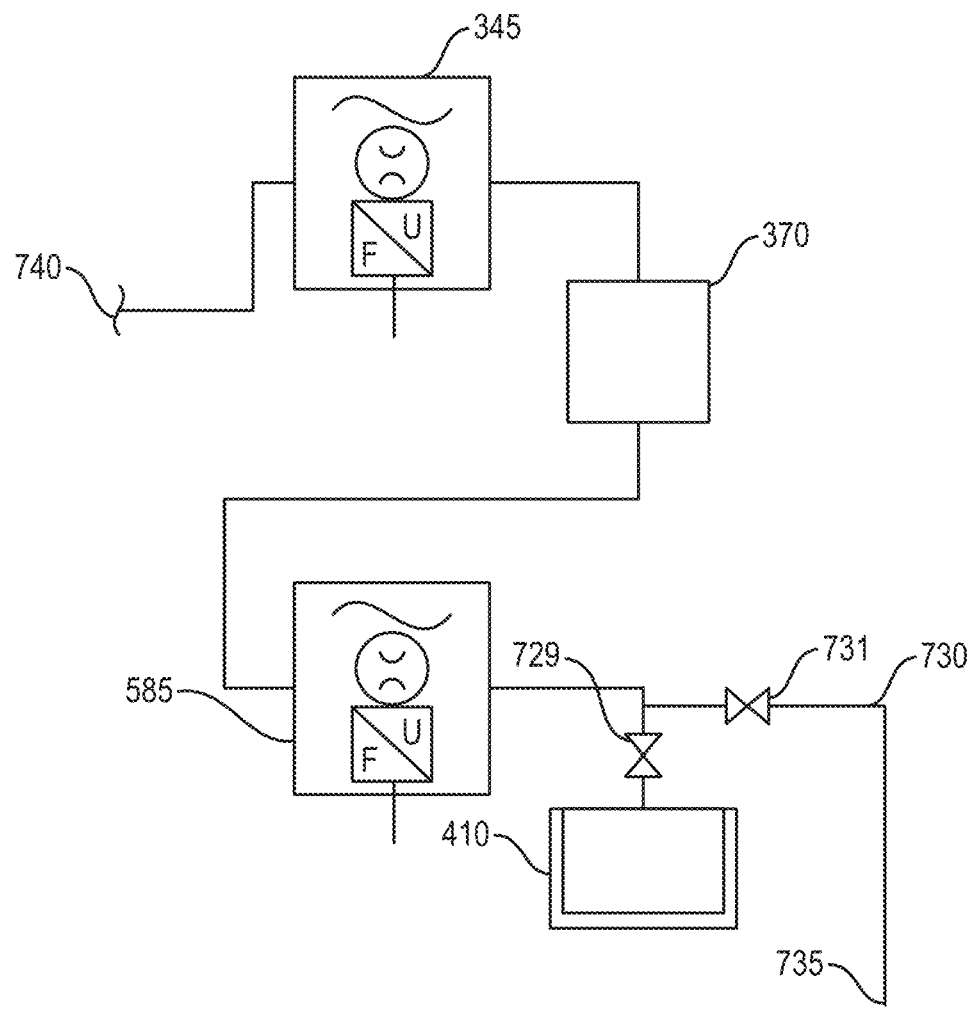
FIG. 22 shows a fluid schematic that shows the added stage ten filtration again with the addition of the second bypass for the purified fluid container.

Continuing, FIG. 22 shows a fluid schematic that shows the added stage ten filtration 585, again with the addition of the second bypass 730 for the purified fluid container 410.

Broadly in referring to FIGS. 1 to 22, the present invention is a self-contained modular decentralized point of use fluid treatment system apparatus 50 disposed in an open atmosphere environment 55, the self-contained modular decentralized point of use fluid treatment system apparatus 50 is for treating the fluid 60 in going from the raw fluid state 65 to the purified fluid state 70, the fluid treatment system apparatus 50 including a frustro-conical replaceable filter media element 75 loosely disposed in a matching frusto-conical housing 80, wherein the frustro-conical replaceable filter media element 75 is in the range of approximately twenty microns to approximately one-hundred fifty microns, with the frustro-conical replaceable filter media element 75 and the frustro-conical housing 80 are constructed as an upwardly facing diverging environmentally open to the atmosphere primary inlet reservoir 85 with a gravity induced converging fluid filtration of the raw fluid 90, being operational to functionally provide an initial coarse of raw fluid filtration defined as a stage one fluid filtration 95 that is discharged therethrough a convergent gravity feed outlet 100, see in particular FIGS. 1 to 3, FIGS. 9 to 13, FIGS. 14 to 17, and FIGS. 19 to 20.

Further included in the present invention is an influent vessel 105 having an upper influent vessel inlet 110 that is in a first fluid communication 115 with the convergent gravity feed outlet 100, the influent vessel 105 also having a lower influent vessel outlet 120, the influent vessel 105 having an internal volume 125, also in addition the fluid flow sensor 130 having a fluid flow sensor inlet 135 that is in a second fluid communication 140 with the lower influent vessel outlet 120, the fluid flow sensor 130 having a fluid flow sensor outlet 145, the fluid flow sensor 130 further outputs an electrical signal 150 in conjunction with a flow state status being defined as a fluid 60 flow state and a non-fluid 60 flow state, see FIGS. 1 to 4, FIGS. 14 to 17, 19, and 20.

Additionally included in the present invention is a fluid pump and motor combination 155 with a fluid pump inlet 160 that is in a third fluid communication 165 with the fluid flow sensor outlet 145, the fluid pump 155 also having a fluid pump outlet 170, the fluid pump 155 is sized and configured to have a volumetric flowrate 171 in the range of approximately ten percent to approximately twenty five percent of a batch volume of the raw fluid 65 to operationally facilitate a selected empty bed contact time (EBCT) of the fluid 60 as the fluid 60 is processed therethrough the self-contained modular decentralized point of use fluid treatment system apparatus 50 to operationally accomplish the end purified fluid state 70, the batch volume is defined as a portion of the internal volume 125, alternatively the fluid pump 155 can operate in a continuous flow state of the purified fluid 70 with the volumetric flowrate, see FIGS. 1 to 4, FIGS. 16 to 17, and FIGS. 19 to 20.

The present invention also has included control circuitry 175 to activate 215 and to deactivate 220 the fluid pump and motor combination 155, the control circuitry 175 is operative to facilitate a batch system process of the fluid 60 treatment 65 to 70 in going from the raw fluid state 65 to the purified fluid state 70, the control circuitry 175 is in a first electrical communication 180 with the fluid flow sensor 130 electrical signal output 150 for a control circuitry 175 input 185, wherein the control circuitry 175 is operative to monitor 151 the fluid flow sensor 130 electrical output signal 150, further the control circuitry 175 is in a second electrical communication 190 with a manually selectable switch 195, wherein the control circuitry 175 is operative to monitor the manually selectable switch 195, wherein the control circuitry 175 is operative to produce a plurality of event marker signals 200 to an electrical relay 205 that is in a third electrical communication 210 with the fluid pump and motor combination 155 to operationally enable a first function of a manual pump and motor 155 activation 215 and to enable a second function of an automatic pump and motor deactivation 220 upon the fluid flow sensor 130 being in the non-fluid 60 flow state to protect the pump and motor combination 155 from damage, see in particular FIG. 2.

Additionally included in the presentation invention 50 is a stage two filtration fluid filter 225 having a stage two filtration fluid filter inlet 230 and a stage two filtration fluid filter outlet 235, wherein the stage two filtration fluid filter inlet 230 is in a fourth fluid communication 240 with the fluid pump outlet 170, the stage two filtration fluid filter 225 is a mechanical string wound type having filtration levels of less than approximately fifty microns, also a stage three filtration fluid filter 245 having a stage three filtration fluid filter inlet 250 and a stage three filtration fluid filter outlet 255, wherein the stage three filtration fluid filter inlet 250 is in a fifth fluid communication 260 with the stage two filtration fluid filter outlet 235, the stage three filtration fluid filter 245 is a mechanical string wound type having filtration levels of less than approximately ten microns. Also, a stage four filtration 265 being an activated granular carbon absorption fluid filter having a stage four filtration fluid filter inlet 270 and a stage four filtration fluid filter outlet 275, wherein the stage four filtration fluid filter inlet 270 is in a sixth fluid communication 280 with the stage three filtration fluid filter outlet 255, the stage four filtration 265 activated granular carbon absorption fluid filter is an anti-microbial being as an example a silver impregnated twenty mesh by fifty mesh or two-hundred and ninety seven micron to eight-hundred forty one micron coconut shell based granular activated carbon being operational to functionally to help remove organics and help resist microbial contamination from the fluid 60, 65, see FIGS. 1 to 4 and FIGS. 14 to 18, and 20.

Continuing in the present invention included is a stage five filtration 285 being an activated granular carbon absorption fluid filter having a stage five filtration fluid filter inlet 290 and a stage five filtration fluid filter outlet 295, wherein the stage five filtration fluid filter inlet 290 is in a seventh fluid communication 300 with the stage four filtration fluid filter outlet 275, the stage five filtration 285 activated granular carbon absorption fluid filter is an acid washed twelve mesh by forty mesh or four-hundred micron to one-thousand six-hundred and eighty micron coconut shell based granular activated carbon being operational to functionally help remove per- and polyfluoroalkyl substances or PFAS including PFOS. Also, included is a stage six filtration 305 being an anion exchange resin fluid filter having a stage six filtration fluid filter inlet 310 and a stage six filtration fluid filter outlet 315, wherein the stage six filtration fluid filter inlet 310 is in an eighth fluid communication 320 with the stage five filtration fluid filter outlet 295, the stage six filtration 305 anion exchange resin fluid filter is a color indicating anion resin in hydroxide form polystyrenic porous gel sixteen mesh by fifty mesh or two-hundred ninety seven micron to eleven-hundred ninety micron being operational to functionally help remove anions that can include but are not limited to chlorine, hydroxide, iodide, dichromate, oxide, and sulfate, see FIGS. 1 to 4 and FIGS. 14 to 17.

Further, in the present invention included is a stage seven filtration 325 being a cation exchange resin fluid filter having a stage seven filtration fluid filter inlet 330 and a stage seven filtration fluid filter outlet 335, wherein the stage seven filtration fluid filter inlet 330 is in a ninth fluid communication 340 with the stage six filtration fluid filter outlet 315, the stage seven filtration 325 cation exchange resin fluid filter is a color indicating acid cation resin polystyrenic gel with divinybenzene, hydrogen form being a sixteen mesh by fifty mesh or two-hundred ninety seven micron to eleven-hundred ninety micron being operational to functionally help remove minerals or cationic constituents that include but are not limited to barium, cadmium, copper, lead, calcium, and magnesium, see FIGS. 1 to 4 and FIGS. 14 to 17.

Also included is a stage eight filtration 345 being a first ultraviolet light module having a first ultraviolet light module inlet 350 and a first ultraviolet light module outlet 355, wherein the first ultraviolet light module inlet 350 is in a tenth fluid communication 360 with the stage seven filtration fluid filter outlet 335, the stage eight filtration 345 first ultraviolet light module includes an integral flow switch 365 that activates the first ultraviolet light module with fluid 60 flow and deactivates said first ultraviolet light module without fluid 60 flow, the first ultraviolet light module is operational to functionally help remove pathogens. Further, a stage nine filtration 370 being a mineral cartridge module having a mineral cartridge module inlet 375 and a mineral cartridge module outlet 380, wherein the mineral cartridge module inlet 375 is in an eleventh fluid communication 385 with the stage eight 345 ultraviolet light module outlet, the mineral cartridge module 370 is operational to help raise the fluid 60 pH and alkalinity, see FIGS. 1 to 4, FIGS. 14 to 16, and FIGS. 21 and 22.

The present invention also includes a structural framework 390 formed into a skeletal parallelepiped shape partially by the plurality of longwise beams 396 that is defined as an outer boundary 395 of the structural framework 390, the structural framework 390 further comprising a plurality of cross beams 400 that are disposed completely within the skeletal parallelepiped shape, a combination 405 of the plurality of cross beams 400 and the skeletal parallelepiped shape structurally support the frustro-conical replaceable filter media element 75 matching frustro-conical housing 80, the influent vessel 105, the fluid flow sensor 130, the fluid pump and motor combination 155, the control circuitry 175, the stage two filtration fluid filter 225, the stage three filtration fluid filter 245, the stage four filtration 265, the stage five filtration 285, the stage six filtration 305, the stage seven filtration 325, the stage eight filtration 345, and the stage nine filtration 370 are all disposed within the skeletal parallelepiped shape of the structural framework 390, see FIGS. 5 to 8 and FIGS. 14 to 19.

Next, included in the present invention is a purified fluid container 410 that is removably engageable 415 to the structural framework 390, the purified fluid container 410 having an inlet port 420 that has a removably engageable interface 425 that is in a twelfth fluid communication 430 with the mineral cartridge module outlet 380, the purified fluid container 410 having a completely removed state 435 from the structural framework 390, the purified fluid container 410 operationally facilitating remote storage of the purified fluid container 410 being filled with the purified fluid 70, further the purified fluid container 410 having an installed state 440 wherein the purified fluid container 410 is engaged into the structural framework 390 such that positionally the purified fluid container 410 is completely disposed within the skeletal parallelepiped shape 390.

Also in the present invention, disposed within the skeletal parallelepiped shape 390 is the frustro-conical replaceable filter media element 75 matching frustro-conical housing 80, the influent vessel 105, the fluid flow sensor 130, the fluid pump and motor combination 155, the control circuitry 175, the stage two filtration fluid filter 225, the stage three filtration fluid filter 245, the stage four filtration 265, the stage five filtration 285, the stage six filtration 305, the stage seven filtration 325, the stage eight filtration 345, and the stage nine filtration 370 that are all disposed within the skeletal parallelepiped shape 390, wherein the skeletal parallelepiped shape 390 with the fluid treatment system apparatus 50 disposed completely within, is a completely open framework 445 that facilitates visual monitoring, data collection, and control of the fluid 60 treatment system apparatus 50 from outside of the skeletal parallelepiped shape 390 by a user, see FIGS. 14 to 19.

Alternatively, for the self-contained modular decentralized point of use fluid treatment system apparatus 50, wherein the first fluid communication 115, the second fluid communication 140, the third fluid communication 165, the fourth fluid communication 240, the fifth fluid communication 260, the sixth fluid communication 280, the seventh fluid communication 300, the eighth fluid communication 320, the ninth fluid communication 340, the tenth fluid communication 360, the eleventh fluid communication 385, and the twelfth fluid communication 430 can all be constructed of non-metallic materials to reduce metals leaching from varying fluid pH levels thought the fluid treatment system apparatus 50 from the fluid 60 having varying pH levels.

An option for the self-contained modular decentralized point of use fluid treatment system apparatus 50, wherein the purified fluid container 410 can have an inner surface 450 that is treated with an anti-microbial coating 455 to operationally facilitate longer removed state 435 time periods to help preserve the purified fluid 70 disposed within the purified fluid container 410, wherein the purified fluid 70 is in contact 460 with the inner surface 450 anti-microbial coating 455, see FIG. 1.

Another option for the self-contained modular decentralized point of use fluid treatment system apparatus 50, wherein the influent vessel 105 can have an interior surface 465 that is treated with an anti-microbial coating 470 to operationally facilitate an added layer of pretreatment of the raw fluid 65, wherein the raw fluid 65 is in contact 475 with the interior surface 465 anti-microbial coating 470, further operationally the interior surface 465 anti-microbial coating 470 can help resist contamination of the interior surface 465 of the influent vessel 105, see FIG. 1.

A continuing option for the self-contained modular decentralized point of use fluid treatment system apparatus 50, can further comprise a means 480 for the gas pressure source disposed 485 at the upwardly facing diverging environmentally open to the atmosphere 55 primary inlet reservoir 85, wherein the means 480 for the gas pressure source is in a substantially fluid tight first gas communication 490 with the primary inlet reservoir 85 to operationally substitute for a failure of the fluid pump and motor combination 155, wherein the means 480 for the gas pressure source will push the fluid 60 therethrough the fluid treatment system apparatus 50 in processing the fluid 60 from the raw fluid state 65 to the purified fluid state 70 in a batch mode for the fluid 65 disposed within the influent vessel, see in particular FIGS. 3 and 20.

A further option for the self-contained modular decentralized point of use fluid treatment system apparatus 50, can further comprise a thirteenth fluid communication 500 that acts as a bypass as between the fluid pump and motor combination 155 the fluid pump inlet 160 and the fluid pump outlet 170 to operationally allow for the fluid 60 to bypass the fluid pump and motor combination 155 while the fluid 60 is pushed therethrough the fluid treatment system 50 by the means 480 for the gas pressure source, see in particular FIGS. 3 and 20.

Another option for the self-contained modular decentralized point of use fluid treatment system apparatus 50, can further comprise a pair of check valves comprising a first check valve 505 and a second check valve 515, wherein the first check valve 505 is disposed 510 in the thirteenth fluid communication 500 being positioned adjacent to the fluid pump inlet 160 such that the first check valve 505 flow allowed is away from the fluid pump inlet 160, further the second check valve 515 is disposed 520 in-between the fluid pump outlet 170 and the thirteenth fluid communication 500 such that the second check valve 515 flow allowed is away from the fluid pump outlet 170, the first 505 and second 515 check valves are operational to functionally prevent the fluid pump and motor combination 155 from having a backflow during the fluid 60 being pushed therethrough the fluid treatment system 50 by the means 480 for the gas pressure source, see FIGS. 3 and 20.

A further option for the self-contained modular decentralized point of use fluid treatment system apparatus 50, wherein the means 480 for the gas pressure source is selected from the group consisting of a compressor 680, an accumulator 685, a piston 690 movably disposed within a cylinder, a bladder 695, or a pressure tank 700, see FIG. 3.

Continuing, alternatively for the a self-contained modular decentralized point of use fluid treatment system apparatus 50, wherein the influent vessel 105 can further comprise structure 525 to be removably engageable to said structural framework 390, also the lower influent vessel 105 outlet 120 has a removably engageable 530 interface that is disposed in the second fluid communication 140, the influent vessel 105 having a completely removed state 535 from the structural framework 390, the influent vessel 105 operationally facilitating remote batch filling of the influent vessel 105 with the raw fluid 65, further the influent vessel 105 having an installed state 540 wherein the influent vessel 105 is engaged into the structural framework 390 such that positionally 545 the influent vessel 105 is completely disposed within the structural frame work 390 skeletal parallelepiped shape, see FIGS. 14 and 17.

Further, alternatively, for the self-contained modular decentralized point of use fluid treatment system apparatus 50, wherein the purified fluid container 410 can further comprise an overflow control 570 that is constructed of a first aperture 555 disposed therethrough the purified fluid container 410 in a wall 550 of the purified fluid container 410, wherein the first aperture 555 is positioned vertically adjacent 560 to the purified fluid container 410 inlet port, the overflow control also includes also an overflow connector 565 and discharge tube that form a fourteenth fluid communication 570 from the first aperture 555 to a fluid 70 drain to operationally not cause damage to the fluid treatment system apparatus 50 from overfilling the purified fluid container 410 with the purified fluid 70, see FIGS. 3 and 21.

Optionally, for the self-contained modular decentralized point of use fluid treatment system apparatus 50, can further comprise a plurality of differential pressure sensors 575 wherein each differential pressure sensor 575 has a perceptible output 580 that can be monitored and recorded to indicate acceptable operational function or maintenance required, the plurality of differential pressure sensors 575 are each disposed as follows; between the fourth fluid communication 240 and the fifth fluid communication 260 to monitor acceptable operational function or maintenance on the stage two filtration 225, between the fifth fluid communication 260 and the sixth fluid communication 280 to monitor acceptable operational function or maintenance on the stage three filtration 245, between the sixth fluid communication 280 and the seventh fluid communication 300 to monitor acceptable operational function or maintenance on the stage four filtration 265, between the seventh fluid communication 300 and the eighth fluid communication 320 to monitor acceptable operational function or maintenance on the stage five filtration 285, between the eighth fluid communication 320 and the ninth fluid communication 340 to monitor acceptable operational function or maintenance on the stage six filtration 305, between the ninth fluid communication 340 and the tenth fluid communication 360 to monitor acceptable operational function or maintenance on the stage seven filtration 325, and between the eleventh fluid communication 385 and the twelfth fluid communication 430 to monitor acceptable operational function or maintenance on the stage nine filtration 370, see FIG. 3.

Alternatively, for the self-contained modular decentralized point of use fluid treatment system apparatus 50, can further comprise a stage ten filtration 585 being a second ultraviolet light module having a second ultraviolet light module inlet 590 and a second ultraviolet light module outlet 595, wherein the second ultraviolet light module inlet 590 is disposed in fluid communication with the twelfth fluid communication 430 being with the stage nine filtration 370 mineral cartridge module outlet 380, the second ultraviolet light module outlet is in a fourteenth fluid communication 600 with the purified fluid container 410 inlet port 420, the stage ten filtration 585 second ultraviolet light module includes an integral flow switch 605 that activates the second ultraviolet light module with fluid 60 flow and deactivates said second ultraviolet light module without fluid 60 flow, said second ultraviolet light module is operational to functionally further help remove pathogens, see FIGS. 4 and 22.

Optionally, for the self-contained modular decentralized point of use fluid treatment system apparatus 50, can further comprise the stage eleven filtration 610 being a third ultraviolet light module having a third ultraviolet light module inlet 615 and a third ultraviolet light module outlet 620, wherein the third ultraviolet light module inlet 615 is disposed in fluid communication with the sixth fluid communication 280 being with the stage three filtration outlet 255, the third ultraviolet light module outlet is in a fifteenth fluid communication 625 with the stage four fluid filter inlet 270, the stage eleven filtration 610 third ultraviolet light module includes an integral flow switch 630 that activates the third ultraviolet light module with fluid 60 flow and deactivates the third ultraviolet light module without fluid 60 flow, the third ultraviolet light module is operational to functionally further help remove pathogens, see FIG. 4.

Alternatively, for the self-contained modular decentralized point of use fluid treatment system apparatus 50, can further comprise a chlorine disinfectant residual test kit 635 including chlorine test strips 640 and instructions 645 to test for absence of chlorine in the purified fluid 70 disposed in the purified fluid container 410 to operationally check the efficacy of the stage four 265 and stage five 285 activated granular carbon absorption fluid filters, see FIG. 4.

Another option in the event of the failure of UV light modules 345, 585, and/or 610, for the self-contained modular decentralized point of use fluid treatment system apparatus 50, it can further comprise the bleach kit 650 with instructions 660 to add, agitate, and have dwell time of additional chlorine from the bleach to the purified fluid 70 disposed within the purified fluid container 410 in the event of the first ultraviolet light module failure 345, further using the chlorine disinfectant residual test kit 635 including chlorine test strips 640 to test for a desired chlorine level in the purified fluid 70 and repeating the instructions 660 to add, agitate, and have dwell time of additional chlorine to achieve the desired chlorine level in the purified fluid 70, see FIG. 4.

A further option for the self-contained modular decentralized point of use fluid treatment system apparatus 50, can further comprise a means 665 for accommodating a utility fluid pressure source 666 disposed at the upwardly facing diverging environmentally open 55 to the atmosphere primary inlet reservoir 85, wherein the means 665 for accommodating the utility fluid pressure source 666 converts the upwardly facing diverging environmentally open 55 to the atmosphere primary inlet reservoir 85 into a closed to the environment 55 primary inlet reservoir 85 to accommodate the utility fluid pressure source 666, resulting in the utility fluid pressure source 666 being in a substantially fluid tight initial fluid communication with the primary inlet reservoir 85 to operationally substitute for the raw fluid 65 coming from the utility fluid pressure source 666, wherein the utility fluid pressure source 666 will push the fluid therethrough the fluid treatment system apparatus 50 in processing the fluid 60 from a raw fluid state 65 to a purified fluid state 70 in a continuous flow mode for the fluid 60 disposed within the influent vessel 105, see FIGS. 3 and 20.

Alternatively, for the self-contained modular decentralized point of use fluid treatment system apparatus 50, can further comprise the thirteenth fluid communication 500 that acts as a bypass as between the fluid pump and motor combination 155 the fluid pump inlet 160 and the fluid pump outlet 170 to operationally allow for the fluid 60 to bypass the fluid pump and motor combination 155 while the fluid 60 is pushed therethrough the fluid treatment system by the utility fluid pressure source 666 through the by the means 665 for accommodating the utility fluid pressure source 666, see FIG. 3.

Optionally, for the self-contained modular decentralized point of use fluid treatment system apparatus 50, can further comprise a pair of check valves comprising the first check valve 505 and the second check valve 515, wherein the first check valve 505 is disposed in the thirteenth fluid communication 500 being positioned adjacent to the fluid pump inlet 160 such that the first check valve 505 flow allowed is away from the fluid pump inlet 160, further the second check valve 515 is disposed in-between the fluid pump outlet 170 and the thirteenth fluid communication 500 such that the second check valve 515 flow allowed is away from the fluid pump outlet 170, the first 505 and second 515 check valves are operational to functionally prevent the fluid pump and motor combination 155 from having a backflow during the fluid 60 being pushed therethrough the fluid treatment system 50 by the utility fluid pressure source 666, by means 665 for accommodating the utility pressure source 666, see FIG. 3.

Again, optionally for the self-contained modular decentralized point of use fluid treatment system apparatus 50, wherein the fluid flow sensor 130 can further comprise a perceptible output 151 that indicates an instantaneous flowrate that facilitates a manually selectable fluid 60 flow rate of the raw fluid 65 from the utility fluid pressure source 666 to operationally set a fluid 60 flow rate that substantially matches the volumetric flowrate, see FIGS. 2 and 3.

Further, optionally for the self-contained modular decentralized point of use fluid treatment system apparatus 50, can further comprise a first bypass 715 for the influent vessel 105 for accommodating a utility fluid pressure source 666 by means 665 for accommodating the utility pressure source 666, the first bypass 715 is disposed positionally to operationally bypass the upwardly facing diverging environmentally open to the atmosphere 55 primary inlet reservoir 85, wherein the first bypass 710 for accommodating the utility fluid pressure source 666 facilitates direct fluid communication from the utility fluid pressure source 666 to the fluid flow sensor 130 resulting in the utility fluid pressure source 666 being in a substantially fluid tight initial fluid communication with the fluid flow sensor 130 to operationally substitute for the raw fluid 65 coming from the primary inlet reservoir 85 and the influent vessel 105, wherein the utility fluid pressure source 666 will push the fluid 60 therethrough the fluid treatment system apparatus 50 in processing the fluid 60 from the raw fluid state 65 to a purified fluid state 70 in a continuous flow mode, see FIG. 20.

Again, optionally for the self-contained modular decentralized point of use fluid treatment system apparatus 50, can further comprise the thirteenth fluid communication 500 that acts as a bypass as between the fluid pump and motor combination 155 the fluid pump inlet 160 and the fluid pump outlet 170 to operationally allow for the fluid 60 to bypass the fluid pump and motor combination 155 while the fluid 60 is pushed therethrough the fluid treatment system 50 by the utility fluid pressure source 666 by the means 665 for accommodating the utility fluid pressure source 666, see FIG. 3.

Also, optionally for the self-contained modular decentralized point of use fluid treatment system apparatus 50, can further comprise a pair of check valves comprising a first check valve 505 and a second check valve 515, wherein the first check valve 505 is disposed in the thirteenth fluid communication 500 being positioned adjacent to the fluid pump inlet 160 such that the first check valve 505 flow allowed is away from the fluid pump inlet 160, further the second check valve 515 is disposed in-between the fluid pump outlet 170 and the thirteenth fluid communication 500 such that the second check valve 515 flow allowed is away from the fluid pump outlet 170, the first 505 and second 515 check valves are operational to functionally prevent the fluid pump and motor combination 155 from having a backflow during the fluid 60 being pushed therethrough the fluid treatment system 50 by the utility fluid pressure source 666, by the means 665 for accommodating the utility fluid pressure source 666, see FIG. 3.

Further, optionally, the self-contained modular decentralized point of use fluid treatment system apparatus 50, can further comprise a first pair of isolation valves 506 and a first flow control valve 507 to bypass the first check valve 505 should the first check valve 505 operationally fail, also further comprising a second pair of isolation valves 516 and a second flow control valve 517 to bypass the second check valve 515 should the second check valve 515 operationally fail, see FIG. 20.

Another option, for the self-contained modular decentralized point of use fluid treatment system apparatus 50, can further comprise a second bypass 730 for the purified fluid container 410 for accommodating a utility fluid pressure source 666, the second bypass 730 is disposed positionally to operationally bypass the purified fluid container 410, wherein the second bypass 730 for accommodating the utility fluid pressure source 666 operationally facilitates direct fluid communication from the utility fluid pressure source 666 to a fluid supply system, wherein the utility fluid pressure source 666 will push the fluid therethrough the fluid treatment system apparatus 50 in processing the fluid 60 from the raw fluid state 65 to a purified fluid state 70 in a continuous flow mode, see FIGS. 3, 20, and 22.

Accordingly, the present invention of the self-contained modular decentralized point of use fluid treatment system apparatus has been described with some degree of particularity directed to the embodiments of the present invention. It should be appreciated, though; that the present invention is defined by the following claims construed in light of the prior art so modifications or changes may be made to the exemplary embodiments of the present invention without departing from the inventive concepts contained therein.

The invention claimed is:

1. A self-contained modular decentralized point of use fluid treatment system apparatus disposed in an open atmosphere environment, said self-contained modular decentralized point of use fluid treatment system apparatus is for treating a fluid in going from a raw fluid state to a purified fluid state, said fluid treatment system apparatus comprising:
 a. a frustro-conical replaceable filter media element loosely disposed in a matching frusto-conical housing, wherein said frustro-conical replaceable filter media element is in the range of approximately twenty microns to approximately one-hundred fifty microns, with said frustro-conical replaceable filter media element and said frustro-conical housing are constructed as an upwardly facing diverging environmentally open to the atmosphere primary inlet reservoir with a gravity induced converging fluid filtration of the raw fluid, being operational to functionally provide an initial coarse of raw fluid filtration defined as a stage one fluid filtration that is discharged therethrough a convergent gravity feed outlet;
 b. an influent vessel having an upper influent vessel inlet that is in a first fluid communication with said convergent gravity feed outlet, said influent vessel also having a lower influent vessel outlet, said influent vessel having an internal volume;
 c. a fluid flow sensor having a fluid flow sensor inlet that is in a second fluid communication with said lower influent vessel outlet, said fluid flow sensor having a fluid flow sensor outlet, said fluid flow sensor further outputs an electrical signal in conjunction with a flow state status being defined as a fluid flow state and a non-fluid flow state;
 d. a fluid pump and motor combination with a fluid pump inlet that is in a third fluid communication with said fluid flow sensor outlet, said fluid pump also having a fluid pump outlet, said fluid pump is sized and configured to have a volumetric flowrate in the range of approximately ten percent to approximately twenty five percent of a batch volume of the raw fluid to operationally facilitate a selected empty bed contact time (EBCT) of the fluid as the fluid is processed therethrough said self-contained modular decentralized point of use fluid treatment system apparatus to operationally accomplish the end purified fluid state, said batch volume is defined as a portion of said internal volume, alternatively said fluid pump can operate in a continuous flow state of the purified fluid with said volumetric flowrate;
 e. control circuitry to activate and to deactivate said fluid pump and motor combination, said control circuitry is operative to facilitate a batch system process of the fluid treatment in going from the raw fluid state to the purified fluid state, said control circuitry is in a first electrical communication with said fluid flow sensor electrical signal output for a control circuitry input, wherein said control circuitry is operative to monitor said fluid flow sensor electrical output signal, further said control circuitry is in a second electrical communication with a manually selectable switch, wherein said control circuitry is operative to monitor said manually selectable switch, wherein said control circuitry is operative to produce a plurality of event marker signals to an electrical relay that is in a third electrical communication with said fluid pump and motor combination to operationally enable a first function of a manual pump and motor activation and to enable a second function of an automatic pump and motor deactivation upon said fluid flow sensor being in said non-fluid flow state to protect said pump and motor combination from damage;
 f. a stage two filtration fluid filter having a stage two filtration fluid filter inlet and a stage two filtration fluid filter outlet, wherein said stage two filtration fluid filter inlet is in a fourth fluid communication with said fluid pump outlet, said stage two filtration fluid filter is a mechanical string wound type having filtration levels of less than approximately fifty microns;
 g. a stage three filtration fluid filter having a stage three filtration fluid filter inlet and a stage three filtration fluid filter outlet, wherein said stage three filtration fluid filter inlet is in a fifth fluid communication with said stage two filtration fluid filter outlet, said stage three filtration fluid filter is a mechanical string wound type having filtration levels of less than approximately ten microns;
 h. a stage four filtration being an activated granular carbon absorption fluid filter having a stage four filtration fluid filter inlet and a stage four filtration fluid filter outlet, wherein said stage four filtration fluid filter inlet is in a sixth fluid communication with said stage three filtration fluid filter outlet, said stage four filtration activated granular carbon absorption fluid filter is anti-microbial and ninety seven micron to eight-hundred forty one micron coconut shell based granular activated carbon being operational to functionally to help remove organics and help resist microbial contamination;

i. a stage five filtration being an activated granular carbon absorption fluid filter having a stage five filtration fluid filter inlet and a stage five filtration fluid filter outlet, wherein said stage five filtration fluid filter inlet is in a seventh fluid communication with said stage four filtration fluid filter outlet, said stage five filtration activated granular carbon absorption fluid filter is an acid washed four-hundred micron to one-thousand six-hundred and eighty micron coconut shell based granular activated carbon being operational to functionally help remove per- and polyfluoroalkyl substances or PFAS including PFOS;

j. a stage six filtration being an anion exchange resin fluid filter having a stage six filtration fluid filter inlet and a stage six filtration fluid filter outlet, wherein said stage six filtration fluid filter inlet is in an eighth fluid communication with said stage five filtration fluid filter outlet, said stage six filtration anion exchange resin fluid filter is a color indicating anion resin in hydroxide form polystyrenic porous gel two-hundred ninety seven micron to eleven-hundred ninety micron being operational to functionally help remove anions that can include but are not limited to chlorine, hydroxide, iodide, dichromate, oxide, and sulfate;

k. a stage seven filtration being a cation exchange resin fluid filter having a stage seven filtration fluid filter inlet and a stage seven filtration fluid filter outlet, wherein said stage seven filtration fluid filter inlet is in a ninth fluid communication with said stage six filtration fluid filter outlet, said stage seven filtration cation exchange resin fluid filter is a color indicating acid cation resin polystyrenic gel with divinybenzene, hydrogen form being two-hundred ninety seven micron to eleven-hundred ninety micron being operational to functionally help remove minerals or cationic constituents that include but are not limited to barium, cadmium, copper, lead, calcium, and magnesium;

l. A stage eight filtration being a first ultraviolet light module having a first ultraviolet light module inlet and a first ultraviolet light module outlet, wherein said first ultraviolet light module inlet is in a tenth fluid communication with said stage seven filtration fluid filter outlet, said stage eight filtration first ultraviolet light module includes an integral flow switch that activates said first ultraviolet light module with fluid flow and deactivates said first ultraviolet light module without fluid flow, said first ultraviolet light module is operational to functionally help remove pathogens;

m. a stage nine filtration being a mineral cartridge module having a mineral cartridge module inlet and a mineral cartridge module outlet, wherein said mineral cartridge module inlet is in an eleventh fluid communication with said stage eight ultraviolet light module outlet, said mineral cartridge module is operational to help raise the fluid pH and alkalinity;

n. a structural framework formed into a skeletal parallelepiped shape that is defined as an outer boundary of said structural framework, said structural framework further comprising a plurality of cross beams that are disposed completely within said skeletal parallelepiped shape, a combination of said plurality of cross beams and said skeletal parallelepiped shape structurally support said frustro-conical replaceable filter media element, said matching frustro-conical housing, said influent vessel, said fluid flow sensor, said fluid pump and motor combination, said control circuitry, said stage two filtration fluid filter, said stage three filtration fluid filter, said stage four filtration, said stage five filtration, said stage six filtration, said stage seven filtration, said stage eight filtration, and said stage nine filtration are all disposed within said skeletal parallelepiped shape; and o. a purified fluid container that is removably engageable to said structural framework, said purified fluid container having an inlet port that has a removably engageable interface that is in a twelfth fluid communication with said mineral cartridge module outlet, said purified fluid container having a completely removed state from said structural framework, said purified fluid container operationally facilitating remote storage of said purified fluid container being filled with the purified fluid, further said purified fluid container having an installed state wherein said purified fluid container is engaged into said structural framework such that positionally said purified fluid container is completely disposed within said skeletal parallelepiped shape along with said frustro-conical replaceable filter media element, said matching frustro-conical housing, said influent vessel, said fluid flow sensor, said fluid pump and motor combination, said control circuitry, said stage two filtration fluid filter, said stage three filtration fluid filter, said stage four filtration, said stage five filtration, said stage six filtration, said stage seven filtration, said stage eight filtration, and said stage nine filtration that are all disposed within said skeletal parallelepiped shape, wherein said skeletal parallelepiped shape with said fluid treatment system apparatus disposed completely within, is a completely open framework that facilitates visual monitoring, data collection, and control of said fluid treatment system apparatus from outside of said skeletal parallelepiped shape by a user.

2. A self-contained modular decentralized point of use fluid treatment system apparatus according to claim 1 wherein said first fluid communication, said second fluid communication, said third fluid communication, said fourth fluid communication, said fifth fluid communication, said sixth fluid communication, said seventh fluid communication, said eighth fluid communication, said ninth fluid communication, said tenth fluid communication, said eleventh fluid communication, and said twelfth fluid communication are all constructed of non-metallic materials to reduce metals leaching from varying fluid pH levels thought said fluid treatment system apparatus.

3. A self-contained modular decentralized point of use fluid treatment system apparatus according to claim 1 wherein said purified fluid container has an inner surface that is treated with an anti-microbial coating to operationally facilitate longer said removed state time periods to help preserve the purified fluid disposed within said purified fluid container, wherein said purified fluid is in contact with said inner surface anti-microbial coating.

4. A self-contained modular decentralized point of use fluid treatment system apparatus according to claim 1 wherein said influent vessel has an interior surface that is treated with an anti-microbial coating to operationally facilitate an added layer of pretreatment of the raw fluid, wherein the raw fluid is in contact with said interior surface anti-microbial coating, further operationally said interior surface anti-microbial coating can help resist contamination of said interior surface of said influent vessel.

5. A self-contained modular decentralized point of use fluid treatment system apparatus according to claim 1 further comprising a means for a gas pressure source disposed at said upwardly facing diverging environmentally open to the atmosphere primary inlet reservoir, wherein said means for a gas pressure source is in a substantially fluid tight first gas communication with said primary inlet reservoir to operationally substitute for a failure of said fluid pump and motor combination, wherein said means for a gas pressure source will push the fluid therethrough said fluid treatment system apparatus in processing the fluid from a raw fluid state to a purified fluid state in a batch mode for the fluid disposed within said influent vessel.

6. A self-contained modular decentralized point of use fluid treatment system apparatus according to claim 5 further comprising a thirteenth fluid communication that acts as a bypass between said fluid pump and motor combination said fluid pump inlet and said fluid pump outlet to operationally allow for the fluid to bypass said fluid pump and motor combination while the fluid is pushed therethrough said fluid treatment system by said means for said gas pressure source.

7. A self-contained modular decentralized point of use fluid treatment system apparatus according to claim 6 further comprising a pair of check valves comprising a first check valve and a second check valve, wherein said first check valve is disposed in said thirteenth fluid communication being positioned adjacent to said fluid pump inlet such that said first check valve flow allowed is away from said fluid pump inlet, further said second check valve is disposed in-between said fluid pump outlet and said thirteenth fluid communication such that said second check valve flow allowed is away from said fluid pump outlet, said first and second check valves are operational to functionally prevent said fluid pump and motor combination from having a backflow during the fluid being pushed therethrough said fluid treatment system by said means for said gas pressure source.

8. A self-contained modular decentralized point of use fluid treatment system apparatus according to claim 5 wherein said means for said gas pressure source is selected from the group consisting of a compressor, an accumulator, a piston movably disposed within a cylinder, a bladder, or a pressure tank.

9. A self-contained modular decentralized point of use fluid treatment system apparatus according to claim 1 wherein said influent vessel further comprises structure to be removably engageable to said structural framework, also said lower influent vessel outlet has a removably engageable interface that is disposed in said second fluid communication, said influent vessel having a completely removed state from said structural framework, said influent vessel operationally facilitating remote batch filling of said influent vessel with the raw fluid, further said influent vessel having an installed state wherein said influent vessel is engaged into said structural framework such that positionally said influent vessel is completely disposed within said skeletal parallelepiped shape.

10. A self-contained modular decentralized point of use fluid treatment system apparatus according to claim 1 wherein said purified fluid container further comprises an overflow control that is constructed of a first aperture disposed therethrough said purified fluid container in a wall of said purified fluid container, wherein said first aperture is positioned vertically adjacent to said purified fluid container inlet port, said overflow control also includes also an overflow connector and discharge tube that form a fourteenth fluid communication from said first aperture to a fluid drain to operationally not cause damage to said fluid treatment system apparatus from overfilling said purified fluid container with the purified fluid.

11. A self-contained modular decentralized point of use fluid treatment system apparatus according to claim 1 further comprising a plurality of differential pressure sensors wherein each differential pressure sensor has a perceptible output that can be monitored and recorded to indicate acceptable operational function or maintenance required, said plurality of differential pressure sensors are each disposed as follows; between said fourth fluid communication and said fifth fluid communication to monitor acceptable operational function or maintenance on said stage two filtration, between said fifth fluid communication and said sixth fluid communication to monitor acceptable operational function or maintenance on said stage three filtration, between said sixth fluid communication and said seventh fluid communication to monitor acceptable operational function or maintenance on said stage four filtration, between said seventh fluid communication and said eighth fluid communication to monitor acceptable operational function or maintenance on said stage five filtration, between said eighth fluid communication and said ninth fluid communication to monitor acceptable operational function or maintenance on said stage six filtration, between said ninth fluid communication and said tenth fluid communication to monitor acceptable operational function or maintenance on said stage seven filtration, and between said eleventh fluid communication and said twelfth fluid communication to monitor acceptable operational function or maintenance on said stage nine filtration.

12. A self-contained modular decentralized point of use fluid treatment system apparatus according to claim 1 further comprising a stage ten filtration being a second ultraviolet light module having a second ultraviolet light module inlet and a second ultraviolet light module outlet, wherein said second ultraviolet light module inlet is disposed in fluid communication with said twelfth fluid communication being with said stage nine filtration mineral cartridge module outlet, said second ultraviolet light module outlet is in a fourteenth fluid communication with said purified fluid container inlet port, said stage ten filtration second ultraviolet light module includes an integral flow switch that activates said second ultraviolet light module with fluid flow and deactivates said second ultraviolet light module without fluid flow, said second ultraviolet light module is operational to functionally further help remove pathogens.

13. A self-contained modular decentralized point of use fluid treatment system apparatus according to claim 1 further comprising a stage eleven filtration being a third ultraviolet light module having a third ultraviolet light module inlet and a third ultraviolet light module outlet, wherein said third ultraviolet light module inlet is disposed in fluid communication with said sixth fluid communication being with said stage three filtration outlet, said third ultraviolet light module outlet is in a fifteenth fluid communication with said stage four fluid filter inlet, said stage eleven filtration third ultraviolet light module includes an integral flow switch that activates said third ultraviolet light module with fluid flow and deactivates said third ultraviolet light module without fluid flow, said third ultraviolet light module is operational to functionally further help remove pathogens.

14. A self-contained modular decentralized point of use fluid treatment system apparatus according to claim 1 further comprising a chlorine disinfectant residual test kit including chlorine test strips and instructions to test for absence of chlorine in the purified fluid disposed in said purified fluid container to operationally check the efficacy of said stage four and stage five activated granular carbon absorption fluid filters.

15. A self-contained modular decentralized point of use fluid treatment system apparatus according to claim 14 further comprising a bleach kit with instructions to add, agitate, and have dwell time of additional chlorine from said bleach to the purified fluid disposed within said purified fluid container in the event of said first ultraviolet light module failure, further using said chlorine disinfectant residual test kit including chlorine test strips to test for a desired chlorine level in the purified fluid and repeating said instructions to add, agitate, and have dwell time of additional chlorine to achieve said desired chlorine level in the purified fluid.

16. A self-contained modular decentralized point of use fluid treatment system apparatus according to claim 1 further comprising a means for accommodating a utility fluid pressure source disposed at said upwardly facing diverging environmentally open to the atmosphere primary inlet reservoir, wherein said means for accommodating the utility fluid pressure source converts said upwardly facing diverging environmentally open to the atmosphere primary inlet reservoir into a closed to the environment primary inlet reservoir to accommodate the utility fluid pressure source, resulting in the utility fluid pressure source being in a substantially fluid tight initial fluid communication with said primary inlet reservoir to operationally substitute for the raw fluid coming from the utility fluid pressure source, wherein the utility fluid pressure source will push the fluid therethrough said fluid treatment system apparatus in processing the fluid from a raw fluid state to a purified fluid state in a continuous flow mode for the fluid disposed within said influent vessel.

17. A self-contained modular decentralized point of use fluid treatment system apparatus according to claim 16 further comprising a thirteenth fluid communication that acts as a bypass between said fluid pump and motor combination said fluid pump inlet and said fluid pump outlet to operationally allow for the fluid to bypass said fluid pump and motor combination while the fluid is pushed therethrough said fluid treatment system by the utility fluid pressure source.

18. A self-contained modular decentralized point of use fluid treatment system apparatus according to claim 17 further comprising a pair of check valves comprising a first check valve and a second check valve, wherein said first check valve is disposed in said thirteenth fluid communication being positioned adjacent to said fluid pump inlet such that said first check valve flow allowed is away from said fluid pump inlet, further said second check valve is disposed in-between said fluid pump outlet and said thirteenth fluid communication such that said second check valve flow allowed is away from said fluid pump outlet, said first and second check valves are operational to functionally prevent said fluid pump and motor combination from having a backflow during the fluid being pushed therethrough said fluid treatment system by the utility fluid pressure source.

19. A self-contained modular decentralized point of use fluid treatment system apparatus according to claim 18 wherein said fluid flow sensor further comprises a perceptible output that indicates an instantaneous flowrate that facilitates a manually selectable fluid flow rate of the raw fluid from the utility fluid pressure source to operationally set a fluid flow rate that substantially matches said volumetric flowrate.

20. A self-contained modular decentralized point of use fluid treatment system apparatus according to claim 1 further comprising a first bypass for said influent vessel for accommodating a utility fluid pressure source, said first bypass is disposed positionally to operationally bypass said upwardly facing diverging environmentally open to the atmosphere primary inlet reservoir, wherein said first bypass for accommodating the utility fluid pressure source facilitates direct fluid communication from the utility fluid pressure source to said fluid flow sensor resulting in the utility fluid pressure source being in a substantially fluid tight initial fluid communication with said fluid flow sensor to operationally substitute for the raw fluid coming from said primary inlet reservoir and said influent vessel, wherein the utility fluid pressure source will push the fluid therethrough said fluid treatment system apparatus in processing the fluid from a raw fluid state to a purified fluid state in a continuous flow mode.

21. A self-contained modular decentralized point of use fluid treatment system apparatus according to claim 20 further comprising a thirteenth fluid communication that acts as a bypass between said fluid pump and motor combination said fluid pump inlet and said fluid pump outlet to operationally allow for the fluid to bypass said fluid pump and motor combination while the fluid is pushed therethrough said fluid treatment system by the utility fluid pressure source.

22. A self-contained modular decentralized point of use fluid treatment system apparatus according to claim 21 further comprising a pair of check valves comprising a first check valve and a second check valve, wherein said first check valve is disposed in said thirteenth fluid communication being positioned adjacent to said fluid pump inlet such that said first check valve flow allowed is away from said fluid pump inlet, further said second check valve is disposed in-between said fluid pump outlet and said thirteenth fluid communication such that said second check valve flow allowed is away from said fluid pump outlet, said first and second check valves are operational to functionally prevent said fluid pump and motor combination from having a backflow during the fluid being pushed therethrough said fluid treatment system by the utility fluid pressure source.

23. A self-contained modular decentralized point of use fluid treatment system apparatus according to claim 22 further comprising a first pair of isolation valves and a first flow control valve to bypass said first check valve should said first check valve operationally fail, also further comprising a second pair of isolation valves and a second flow control valve to bypass said second check valve should said second check valve operationally fail.

24. A self-contained modular decentralized point of use fluid treatment system apparatus according to claim 1 further comprising a bypass for said purified fluid container for accommodating a utility fluid pressure source, said bypass is disposed positionally to operationally bypass said purified fluid container, wherein said bypass for accommodating the utility fluid pressure source operationally facilitates direct fluid communication from the utility fluid pressure source to a fluid supply system, wherein the utility fluid pressure source will push the fluid therethrough said fluid treatment system apparatus in processing the fluid from a raw fluid state to a purified fluid state in a continuous flow mode.

* * * * *